United States Patent [19]

Abramsohn et al.

[11] Patent Number: 5,039,598
[45] Date of Patent: Aug. 13, 1991

[54] IONOGRAPHIC IMAGING SYSTEM

[75] Inventors: Dennis A. Abramsohn, Pittsford; John A. Frank, Webster; Joseph Mammino, Penfield; Brendan C. Casey, Webster; Donald S. Sypula, Penfield, all of N.Y.

[73] Assignee: Xerox Corporation, Stamford, Conn.

[21] Appl. No.: 459,392

[22] Filed: Dec. 29, 1989

[51] Int. Cl.$^5$ .................. G03C 5/00; B41M 5/00; G01D 15/06
[52] U.S. Cl. .................. 430/347; 430/346; 430/53; 346/1.1; 346/155; 346/159; 346/135.1; 378/28
[58] Field of Search .......... 430/346, 347, 53; 346/155, 159, 1.1, 135.1; 378/28

[56] References Cited

U.S. PATENT DOCUMENTS

| Re. 30,805 | 11/1981 | Rhoads | 428/35 |
|---|---|---|---|
| 2,027,962 | 1/1936 | Currie | 18/55 |
| 3,086,242 | 4/1963 | Cook et al. | 18/1 |
| 3,184,525 | 5/1965 | Brandt | 264/127 |
| 3,542,229 | 11/1970 | Waltenhofer et al. | 215/1 |
| 3,366,528 | 5/1972 | Barnhardt | 117/49 |
| 3,725,951 | 4/1973 | McCurry | 346/74 ES |
| 3,742,516 | 6/1973 | Cavanaugh et al. | 346/74 R |
| 3,920,991 | 11/1975 | Baker | 378/28 |
| 3,967,959 | 7/1976 | Goffe et al. | 96/1 PS |
| 3,976,484 | 8/1976 | Ando et al. | 96/1 R |
| 4,107,257 | 8/1978 | Webster et al. | 264/270 |
| 4,137,537 | 1/1979 | Takahashi et al. | 346/159 |
| 4,143,965 | 3/1979 | Ando et al. | 355/35 C |
| 4,144,812 | 3/1979 | Julian | 101/382 R |
| 4,144,813 | 3/1979 | Julian | 101/382 R |
| 4,168,974 | 9/1979 | Ando et al. | 96/1 R |
| 4,244,912 | 1/1981 | Battice | 264/338 |
| 4,284,697 | 8/1981 | Ando et al. | 430/53 |
| 4,289,553 | 9/1981 | Nolf | 156/86 |
| 4,304,616 | 12/1981 | Richardson | 156/86 |
| 4,394,340 | 7/1983 | Tarumi et al. | 264/219 |
| 4,410,584 | 10/1983 | Toba et al. | 428/215 |
| 4,427,271 | 1/1984 | Fogg | 351/154 |
| 4,435,066 | 3/1984 | Tarumi et al. | 355/3 SC |
| 4,455,204 | 6/1984 | Pieslak et al. | 204/147 |
| 4,463,363 | 7/1984 | Gundlach et al. | 346/159 |
| 4,474,850 | 10/1984 | Burwasser | 428/336 |
| 4,481,244 | 10/1984 | Haruta et al. | 428/155 |
| 4,491,855 | 1/1985 | Fujii et al. | 346/159 |
| 4,503,111 | 3/1985 | Jaeger et al. | 428/195 |
| 4,505,421 | 3/1985 | Gen et al. | 228/224 |
| 4,516,847 | 5/1985 | Macquszuako et al. | 355/3 TR |
| 4,524,371 | 6/1985 | Sheridon et al. | 346/159 |
| 4,538,163 | 8/1985 | Sheridon et al. | 346/155 |
| 4,555,422 | 11/1985 | Nakamura et al. | 428/36 |
| 4,584,592 | 4/1986 | Tuan et al. | 346/159 |
| 4,593,994 | 6/1986 | Tamura et al. | 355/35 C |
| 4,619,515 | 10/1986 | Maczuszenko et al. | 355/3 R |
| 4,644,373 | 2/1987 | Sheridon et al. | 346/159 |

FOREIGN PATENT DOCUMENTS

| 61-277424A | 6/1985 | Japan . |
| 7005050B | 2/1987 | Japan . |
| 2164000A | 3/1986 | United Kingdom . |

Primary Examiner—Charles L. Bowers, Jr.
Assistant Examiner—Ashley I. Pezzner

[57] ABSTRACT

Processes for preparing ionographic imaging member including providing a flexible, shrinkable tube containing a dielectric film forming polymer having a $T_g$ of at least about $-40°$ C., charge decay of less than about 2 nonocoulombs per cm$^2$ per second and elastic memory, providing a cylindrical support member having an outer diameter that is less than the inner diameter of the flexible tube, applying a continuous coating on the interior of the tube or on the exterior of the cylindrical support member, the coating comprising a material selected from the group consisting of an electrically conductive material, an adhesive material and mixture thereof, shrinking the tube to bring the inner surface of the tube and the outer surface of the cylindrical support member into intimate physical contact with the continuous coating. This imaging member may be employed in an ionographic imaging process.

26 Claims, No Drawings

IONOGRAPHIC IMAGING SYSTEM

BACKGROUND OF THE INVENTION

This invention relates to processes for preparing and using an ionographic imaging member, and in particular, to a process for forming a uniform dielectric imaging layer on a cylindrical substrate and forming images with the imaging member.

In electrography, an electrostatic latent image is formed on a dielectric imaging surface of an imaging layer (electroreceptor) by various techniques such as by an ion stream (ionography), stylus, shaped electrode, and the like. Development of the electrostatic latent image may be effected by contacting the imaging surface with electrostatically attractable marking particles whereby the marking particles deposit on the imaging surface in conformance to the latent image. The deposited marking particles may be transferred to a receiving member and the imaging surface may thereafter be cleaned and cycled through additional latent image forming, marking particle contact, marking particle transfer and cleaning steps. These imaging steps are well known in the art of electrography and disclosed in many patents, for example, in U.S. Pat. Nos. 4,410,584, 4,463,363 to Gundlach et al, 4,524,371 to Sheridan et al, 4,644,373 to Sheridan et al, and 4,584,592 to Tuan et al.

For high quality images, the dielectric layer should have a smooth imaging surface and uniform thickness. Variations in dielectric imaging layer thickness can cause variations in image density and resolution. Most prior techniques for fabricating electroreceptor or dielectric imaging layer thicknesses are expensive and difficult to carry out to produce layers having minimal variance in layer thickness. Although a dielectric sheet can be formed by extrusion and the resulting film laminated to a conductive substrate, the resulting seam is undesirable because high quality images cannot be formed on the seam and devices for cleaning of the electroceptor, e.g. blades, can be damaged by repeated collisions between the blade and the seam during cycling. Also, a dielectric sheet laminated to a conductive substrate may not make intimate electrical contact with the entire surface area of the substrate and the resulting air gaps and their associated dielectric properties are undersirable because high quality images cannot be formed in regions of varying dielectric thickness.

Seamless dielectric layers for electrophotographic imaging members have been prepared by spraying, both solution and powder spray with or without electrostatic enhancement. However, difficulties have been encountered with undesirable surface characteristics of layers formed by spray coating. For example, leveling of the spray deposited coating have often been uneven and orange peel effects have been observed. Moreover, disposal of solvents present handling, toxicity, and contamination difficulties. Moreover, maintenance of spray apparatus is complex and requires a special clean room to eliminate contaminants. Further, considerable material loss is encountered due to overspray. In addition, pin holes can form in the electroreceptor layer thereby adversely affecting image quality. Also, extended drying and or curing at times are necessary to achieve the final electroreceptor layer. Moreover, it is difficult to maintain uniform thickness throughout the electroreceptor layer. Spray coating of electroreceptor layers has also been undesirable or unsuitable where substrates are employed that are solvent or heat sensitive. For example, a temperature sensitive substrate cannot be employed where the electroreceptor comprises a thermoset resin which must be cured by heat. Moreover, multiple spray passes are required for depositing thick electroreceptor coatings. Multiple spray passes with either solution or powdered materials compound many of the above described difficulties and increase the expense and time to form the coatings. Also, the deposition of coatings by spraying results in the building up of the thickness at the edges of the coating which prevents the formation of quality images up to the coating edge.

Seamless dielectric layers for electrophotographic imaging members have also been prepared by dip coating. However, difficulties have been encountered with undesirable surface characteristics of layers formed by dip coating. For example, dip coated layers have often been uneven axially, show sagging, and orange peel effects have been observed. Further the thickness uniformity is adversely affected by variations of the speed of withdrawal from the solution tank. Thus the process requires expensive speed control equipment.

Also, seamless dielectric layers for electrophotographic imaging members have been prepared by metal anodization and polymer fill. However, this process is restricted to metal members with insulating oxides and requires electrochemical and vacuum processing.

PRIOR ART STATEMENT

Japanese Patent Publication J6 1277 424 A to Canon KK, published June 4, 1985. An air shrinkable film is described which is fitted on a substrate in which the pressure inside the film is greater than the pressure outside the film. The air shrinkable film is fitted on a cylindrical substrate which is coated with a photoconductive layer. Air is supplied through an air supply pipe through one end of the film which has been closed so that the inside pressure is greater than the pressure outside the film.

Japanese Patent Publication JA 7005050-B to Sharp KK, published Feb. 3, 1987—Apparatus is disclosed for covering a cylindrical drum with a tube utilizing air pressure. The apparatus comprises an expanding means with an expanding tube, a support for holding the expanding tube in a cylindrical manner by air pressure, a transfer means for transferring the tube, and drum positioning means for positioning a cylindrical drum in a direction in which the tube is transferred. This apparatus is employed to apply a tube of an insulating layer over a photoconductive layer deposited over and around a conductive cylindrical coat drum in an electrophotographic printing apparatus.

U.S. Pat. No. 4,619,515 to Maczuszenko et al, issued October, 1986—An electrostatic printing system is disclosed comprising a rotatable electrostatically chargeable drum and ion deposition means. Air flows between the drum and the ion discharge means. The system may utilize a dielectric layer on the drum. This dielectric layer must have a resisitivity in excess of $10^{12}$ ohm-centimeters and has a preferred thickness of 0.001 to 0.002 inches. The dielectric material can be organic or inorganic such as glass enamel deposited or fused to the surface of a steel or aluminum cylinder. Flame or plasma sprayed high density aluminum oxide may be employed in place of glass enamel. Plastic materials such as polyimides, nylons, or other tough thermoplastic or thermoset resins, are also suitable. In the preferred embodiment, the dielectric layer is formed by making a drum as an aluminum cylinder having an anodized surface of aluminum oxide and by then dehydrating the aluminum cylinder and impregnating surface apertures in the cylinder with zinc stearate.

U.S. Pat. No. 4,516,847 to Maczuszenko et al, issued May 14, 1985—An electrostatic printing system is disclosed in which an electrostatic image is formed on a dielectric-coated drum and toned. The toner image is pressure transfered to a receptor. The dielectric layer on the drum must have a resisitivity in excess of $10^{12}$ ohm-centimeters and has a preferred thickness of 0.001 to 0.002 inches.

U.S. Pat. No. 2,027,962 to Currie, issued Jan. 14, 1936—A process is described in which a preformed plastic is converted into a final form by means of heat treatment whereby the preform assumes the shape and form desired in the finished article.

U.S. Pat. No. 3,086,242 to Cook et al, issued Apr. 23, 1963—The treatment of polymeric materials is disclosed to impart plastic memory characteristics thereto so as to provide heat-unstable products which retain their form and dimensions under low or normal temperature conditions, but which upon heating to a critical temperature change their form and return to their pretreatment form and dimensions.

U.S. Pat. No. 4,555,422 to Nakamura et al, issued Nov. 26, 1985—An article comprising a magnetic shielding thermoplastic polymeric material containing a powdery ferrite and a heat-shrinkable thermoplastic polymeric material layer is disclosed. The article may be imparted with electrostatic shielding properties by incorporating an electrically conductive layer therein. The electrically conductive layer may be sandwichwise disposed between the heat-shrinkable layer and the magnetic shielding layer or may be disposed under the magnetic shielding layer. Alternatively, the electrically conductive particles may be compounded into the heat shrinkable layer to render the layer electrically conductive.

U.S. Pat. No. 4,394,340 to Tarumi et al, issued July 19, 1983—A method is disclosed for producing a thin-walled endless belt by centrifugal mold comprising introducing a liquid curable silicone rubber dissolved in a solvent into a rotating cylindrical mold, hardening the rubber to form a mold surface on the inner surface of the cylindrical mold, and thereafter introducing a thermosetting resin dissolved in a volatile solvent into the mold surface to form the endless belt. In a specific example, the formed cylindrical film of polyimide resin is separated from the layered silicone rubber and the resulting cylindrical film was fitted onto a cylindrical silicone drum and heated to complete hardening of the polyimide. The completely hardened cylindrical film was taken off the silicone drum to give an endless belt.

U.S. Pat. No. 3,184,525 to Brandt, issued May 18, 1965—A process is disclosed for making film of fluorine-containing solid polymers comprising uniformly distributing a powdered chlorine-containing solid over the inside of a cylindrical molding drum, rotating the drum on its axis at a sufficiently film-forming temperature, cooling the polymer while still rotating the molding drum and removing the resulting film from the molding drum.

U.S. Pat. No. 3,666,528 to Barnhardt, issued May 30, 1972—A method is disclosed of applying polyimide compositions coatings of substantial thickness to internal cylindrical surfaces of compressor housings and the like. In a preferred embodiment, a mixture of a solution of polyimide precursors and talc are centrifugally cast onto a metal cylindrical surface such that most of the solvent is evaporated and the precursors are partially cured so as to be structurally self-sustaining.

U.S. Pat. No. 4,107,257 to Webster et al, issued Aug. 15, 1978—A method of lining a pipe is disclosed in which a setable material is introduced into the interior of an inclined pipe at a predetermined rate so that the liquid material flows down along the pipe, shifting the pipe to a horizontal position, spinning the pipe about its axis to distribute the material, and continuing spinning until the material has set. This method is particularly applicable for lining pipes with polyurethane.

U.S. Pat. No. 4,244,912 to Battice, issued Jan. 13, 1981—A process is disclosed comprising treating a mold surface with certain curable silicone release compositions. The release composition provides many easy releases of molded articles such as high resiliency polyurethane foam cushions, polyurethane shoe soles and polyester boat hulls.

U.S. Pat. No. 4,144,812 to Julian, issued Mar. 20, 1979—Various processes are disclosed including a process in which positive gas pressure is employed to expand a sleeve during the time that it is being fitted on or taken off a printing roll core. The principal method disclosed consists of preparing a roll core with an outer surface of which one longitudinal end has a diameter greater than that of the other longitudinal end and a printing sleeve with an inner surface designed to be an interference fit with the outer surface of the core at a design working position, moving the sleeve onto the core from the end of the core of the lesser diameter with an end of the sleeve of greater diameter leading, until the sleeve and core touch around the inner circumference of the sleeve and the sleeve has covered all gas outlets in the core surface, applying gas under pressure inside the sleeve from the said gas outlets to expand the sleeve radially and moving the sleeve while so expanded to its design working position on the core.

U.S. Pat. No. 4,144,813 to Julian, issued Mar. 20, 1979—This appears to be the parent case for the immediately preceding case, U.S. Pat. No. 4,144,813 in the instant patent, a method is disclosed for mounting an undersized printing sleeve on a printing roll core by expansion of the sleeve by gas under elevated pressure past outwardly from the radially outer surface of the core to allow movement of the sleeve along the core, the improvement comprising passing the sleeve through the end without expansion over that substantial portion of a radially outer surface of the core which is of less than a predetermined diameter until it covers all gas outlets in the outer surface, the gas outlets in the outer surface being located in the working length of the outer surface on the side of the circumference of interference having a lesser diameter between the sleeve and the core, where the circumference of interference is the circumferential line on the core located at the location on the core beyond where the sleeve, when slid on a core from one end cannot be moved towards the other other end without expansion of the sleeve, and passing the gas into elevated pressure out of the outlets to expand the sleeve regularly and moving the sleeve into its working position.

U.S. Pat. No. 4,289,553 to Nolff, issued Sept. 15, 1981—A heat recoverable (e.g., a heat-shrinkable polymeric sleeve) is provided with an inner lining of continuous metal foil to provide protection against inward water vapor transmission. It is preferably provided with a central reinforcing means comprising one or more longitudinal compressble coils. Also, in the prior art discussion, various "heat-recoverable" concepts are described.

U.S. Pat. No. 4,304,616 to Richardson, issued Dec. 8, 1981—Radially shrinkable sleeves for covering joints and terminations in high voltage cables are made by radially uniform machining of extruded sleeves comprising an insulating material and at least one other layer which is conductive or semiconductive or exhibits stress control properties. Expansion of the sleeve can be effected before or after machining.

U.S. Pat. No. Re. 30,805 to Rhoads, reissued Nov. 24, 1981—Containers are disclosed provided externally thereof with a heat shrunk, cellular thermoplastic member, circumferentially and snugly engaging a side wall portion of the container; the thermoplastic member comprising a composite structure or laminate of a closed cellular polymeric layer in which the polymer is predominately of olefin moieties and, in adhered relationship to the closed cellular layer, a non-cellular polymeric layer being in snug, heat shrunk engagement with the side wall portion of the container.

U.S. Pat. No. 3,542,229 to Waltenhofen et al, issued Nov. 24, 1970—A band of stretchable heat-shrinkable plastic film is shrunk onto a bottle of thermoplastic material.

U.S. Pat. No. 4,427,271 to Fogg, issued Jan. 24, 1984—A method for conforming a gasket about an ophthalmic lens is disclosed in which a heat-shrinkable material is applied aobut a stack of ophthalmic lenses and heat shrunk. The ophthalmic lens are thereafter separated with the applied heatshrunk material in intimate contact therewith.

U.S. Pat. No. 4,455,204 to Pieslak et al, issued June 19, 1984—An adhesive composition is disclosed having an improved resistance to cathodic disbonding when used to adhere a protective coating such as a polymeric layer to a surface of a metal substrate. In one example, a heat-recoverable sleeve is coated with adhesive on the interior surface thereof. The sleeve is positioned around a pipe and heated to shrink the sleeve onto the pipe and melt or activate the adhesive to bond the sleeve onto the pipe.

U.S. Pat. No. 4,505,421 to Gen et al, issued Mar. 19, 1985—A heat-recoverable solder device is disclosed in which heat-recoverable devices such as heat-shrinkable polymeric sleeves having a fusible insert comprising solder are placed over a pair of wires and heated to shrink the sleeve and melt the solder so that it flows around the wires. The solder flux undergoes a visible color change at the critical solder melting temperature.

U.S. Pat. No. 4,524,371 to N. Sheridon et al, issued June 18, 1985, a fluid jet assisted ion projection printing apparatus is disclosed comprising a housing including ion generation and ion modulating regions.

U.S. Pat. No. 3,725,951 to McCurry, issued Apr. 3, 1973—a method of forming electrostatic images on a dielectric surface is disclosed by controlling the relative ion concentration in a gas stream moving through a channel and directed upon the dielectric surface. Relative ion concentration in the gas stream is controlled by selective application of electric fields of an array of channels. A-15 volt DC supply is employed for the electric fields. A dielectric medium may be precharged with a desired potential with a polarity opposite the ion polarity so that subsequent controlled application of ions forms a latent image on the precharged dielectric surface. The latent image passes through a developer and fixer, "both of which are well known in the art".

U.S. Pat. No. 3,742,516 to Cavanaugh et al, issued June 26, 1973—a printing head is disclosed for forming electrostatic images on a dielectric surface by using selective application of low voltage electric fields to control the relative ion concentration in a gas stream moving through a slot and directed upon the dielectric surface. A−15 volt DC supply is employed for the electric fields. A dielectric medium may be precharged with a desired potential with a polarity opposite the ion polarity so that subsequent controlled application of ions forms a latent image on the precharged dielectric surface. The latent image passes through a developer and fixer, "both of which are well known in the art".

U.S. Pat. No. 4,593,994 to Tamura et al, issued June 10, 1986—An ion flow modulator used in a photocopy machine is described. The ion flow modulator includes an insulating substrate, a common electrode formed on a major surface of the insulating substrate, a plurality of ion flow control electrodes, a photoconductive layer and various other components. Positively charged ions from the modulator form an electrostatic latent image on a dielectric drum which was previously charged with a uniform negative charge. Toner supplied from a toner hopper is attracted to the latent image and the resulting toner image is transferred to a copy sheet and fixed thereto. A specific dielectric drum is disclosed comprising a polyethylene terephthalate layer having a thickness of approximately 20 micrometers.

U.S. Pat. No. 4,168,974 to Ando et al, issued Sept. 25, 1979—An electrophotographic process is disclosed in which an image is formed using a photosensitive screen having a plurality of tiny openings. Image exposure of the uniformly charged screen forms a primary electrostatic latent image on the screen that is employed to modulate ions moving through the screen between a corona ion flow source and screen whereby a secondary electrostatic latent image is formed on a recording member that was previously uniformly charged to a predetermined potential. An insulated recording drum is disclosed comprising a conductive substrate coated with an insulating layer. The electrostatic latent image on the recording drum may be developed by wet type or dry type developing means. The resulting toner image may be transferred to a copy sheet and fixed thereto. An insulating layer thickness of 25 micrometers and dielectricity K of 3 are specifically mentioned.

U.S. Pat. No. 3,976,484 to Ando et al, issued Aug. 24, 1976—An electrophotographic process is disclosed in which an image is formed using a photosensitive screen having a plurality of fine openings. Image exposure of the uniformly charged screen forms a primary electrostatic latent image on the screen that is employed to modulate ions moving through the screen under an applied electric field between an ion flow source and screen whereby a secondary electrostatic latent image is formed on a chargeable recording member consisting of a conductive base and a thin chargeable layer of, for example, a thin layer of polyethylene terephthalate or sufficiently dried conventional paper. The secondary image may be formed on the recording member while it is on a supporting conductive roller applied with a bias voltage. The latent image is developed by a developer and fixed. Development systems employed appear to include liquid and magnetic brush developers.

U.S. Pat. No. 4,137,537 to Takahashi et al, issued Jan. 30, 1979—Electrostatic transfer process and apparatus are disclosed. An insulating surface of a latent image forming material is uniformly charged with an electrostatic charge and the charge in the image forming areas of the insulating surface are subsequently erased by electric discharge from closely spaced pin electrodes. The resulting electrostatic latent image, in the presence of a development electrode, is developed with a developer having a charge of the same polarity as the voltage applied to the development electrode. A magnetic brush development method is disclosed as preferred using a developing bias voltage. The developed image is transferred to a paper sheet. The latent image forming material may comprise a conductive substrate, an undercoat layer of a first dielectric and a recording layer of a second dielectric. In one embodiment, the undercoat layer may have a low electric capacity ($C_2 = 50-100$ pF/cm$^2$) and medium electric resistivity ($\rho_2 = 10^6 - 10^9 \Omega$-cm), and having a thickness of 30 to 80 micrometers. The recording layer have a high electric capacity ($C_1 = 200-500$ pF/cm$^2$) and medium electric resistivity ($\rho_1 = 10^{12} - 10^{15} \Omega$-cm), and having a thickness of 15 to 50 micrometers. The specific inductivity ($\epsilon r_2$) of the undercoat layer was about 4.0 and the specific inductivity of the recording layer was about 7.0. Carbon or a metal oxide may be incorporated in an arcylic, epoxy or melamine resin to obtain the above electric resistivity and specific inductivity for the undercoat. Titanium oxide or the like can be incorporated in an arcylic, epoxy or melamine resin to increase electric capacity to obtain the above electric resistivity and specific inductivity for the recording layer.

U.S. Pat. No. 4,143,965 to Ando et al, issued Mar. 13, 1979—An electrophotographic process is disclosed in which an image is formed using a photosensitive screen having a plurality of tiny openings. Image exposure of the uniformly charged screen forms a primary electrostatic latent image on the screen that is employed to modulate ions moving through the screen between a corona ion flow source and screen whereby a secondary electrostatic latent image is formed on a chargeable recording member. An acceleration field is applied between the screen and the chargeable recording member. An insulative recording drum is disclosed comprising an aluminum drum coated with a 15 micrometer thick layer of insulating polycarbonate. The electrostatic latent image on the recording drum may be toner developed by a developing device and the resulting toner image may be transferred to paper and fused thereto.

U.S. Pat. No. 4,410,584 to Toba et al, issued Oct. 18, 1983—An electrostatic recording member is disclosed comprising a recording layer, an electrically conductive layer and a support, wherein the electrically conductive layer is composed of micro-fine powder dispersed in an organic binder and has a surface resistivity of 106 to 108 ohms. The support may be of various shapes and various metallic or polymer materials. The recording layer is dielectric and has a volume resistivity of at least 1012 ohm.cm. preferably at least 1014 ohm.cm. Dielectric materials such as organic dielectric substances such as polyesters, polycarbonates, polyamides, polyurethanes, (meth)acrylic-type resins, styrene-type resins, polypropylene, etc. or mixtures of inorganic powders, e.g. $TiO_2$, $Al_2O_3$, MgO,etc, and organic dielectric substances are disclosed. A recording layer thickness of at least 1 micrometers, and preferably up to 20 micrometers, especially 2 to 6 micrometers are disclosed. Electrostatic latent images are formed on the recording member by needle electrodes. The electrostatic latent image may be developed and the resulting developed image may be transferred to ordinary paper.

U.S. Pat. No. 3,967,959 to Goffe et al, issued July 6, 1976—a migration imaging system is disclosed in which a migration imaging member comprises a substrate, a softenable layer migration marking material, and an overlayer comprising various materials such as polystyrene, silicone resins, acrylic or cellulosic resins and many other materials, listed for example, in the paragraph bridging columns 6 and 7. The overcoating layer may have a thickness up to about 75 micrometers (if not electrically conductive). The surface of the migration imaging member may be electrically charged in imagewise configuration by various modes including charging or sensitizing through a mask or stencil, shaped electrodes, electron beam and numerous other techniques.

U.S. Pat. No. 4,284,697 to Ando et al, issued Aug. 18, 1981—An electrophotographic process is disclosed in which an image is formed using an arcuate photosensitive screen having a plurality of tiny openings. Image exposure of the uniformly charged screen forms a primary electrostatic latent image on the screen that is employed to modulate ions moving through the screen between a corona ion flow source and screen whereby a secondary electrostatic latent image is formed on a flat or arcuate recording member. The screen or recording member having the greater radius is rotated or moved at a higher velocity than the other. An insulated recording medium is disclosed such as recording paper or a drum comprising an aluminum substrate coated with a 15$\mu$ thick layer of insulative material such as resin or the like provided by coating or adhesion.

The electrostatic latent image on the recording drum may be developed by a developing means. The resulting toner image may be transferred to copy paper and fixed thereto. An insulating layer thickness of 25 micrometers and dielectricity K of 3 are specifically mentioned.

U.S. Pat. No. 4,535,345 to Wilcox et al, issued Aug. 13, 1985—An ion projection apparatus is disclosed including sequentially, an imagewise charging station, a developing station and a fusing station for forming images on a charge receptor sheet. A backing electrode serves to accelerate charge deposition upon the receptor and to provide a counter charge to the latent image ion charge. The backing electrode extends from the ion projection region through the fusing region. The charge receptor sheet is preferably ordinary paper. A magnetic brush roller rotates through a sump of magnetic toner particles where is picks up toner and brushes it over the paper surface. As tendrils of linked toner particles extending from the roller are swept over the paper, a negative charge is induced on the particles and some are attracted to the positive surface charges of the established dipoles and adhere to the paper.

GB 2 164 000 A to Xerox Corporation, published Mar. 12, 1986—A fluid assisted ion projection electrographic copier is disclosed comprising a modulation assembly having a photoconductive layer for controlling the flow of ions along an exit channel in accordance with a raster pattern projected from an original to be copied. Ions allowed to exit the modulation assembly are deposited on a receptor sheet, such as plain or dielectric paper, on a backing electrode. A preferred receptor of ordinary paper is preheated to 150°–160° C.

to drive out moisture and render the paper less conductive so that it can retain a charge. A sheet resistivity of on the order of $10^{15}$ ohm/sq is mentioned. Development is accomplished at a development station comprising a trough containing a magnetic monocomponent toner and a magnetic brush roller. Toner is attracted from the brush roller to the ion image. The resulting toner image is fused.

U.S. Pat. No. 4,463,363 to Gundlach et al, issued July 31, 1984—A fluid jet assisted electrographic marking apparatus for ion projection printing is disclosed wherein ions are generated in a chamber, entrained in a rapidly moving fluid stream, modulated in an electroded exit zone and deposited in an imagewise pattern on a relatively movable charge receptor. A discussion of the prior art describes an ion projection system using a controlled ionized fluid stream for discharging precharged areas on a charge receiving surface. A large field of opposite polarity to the ionic species is maintained between an accelerating electrode and a ion projector housing to attract the the ions to a receiving surface of a receptor sheet.

U.S. Pat. No. 4,538,163 to Sheridon, issued Aug. 27, 1985—A fluid jet assisted ion projection printing apparatus is disclosed wherein substantially equal numbers of positive and negative ions are generated simultaneously during a series of RF breakdowns which take place within a fluid transport channel. A discussion of the prior art describes an ion projection system using a controlled ionized fluid stream for discharging precharged areas on a charge receiving surface. A charge receptor such as ordinary paper collects ions from the fluid stream in image configuration. The charge receptor overlies a biased conductive accelerating electrode plate. Oppositely charged marking particles are attracted to the ion patterns at a development zone.

U.S. Pat. No. 4,524,371 to Sheridon et al, issued June 18, 1985—A fluid jet assisted ion projection printing apparatus is disclosed having a housing including ion generation and ion modulation regions. The ions are deposited on a charge receptor on a backing electrode which may be connected to a high potential source of a sign opposite to that of the corona source.

U.S. Pat. No. 4,644,373 to Sheridan et al, issued Feb. 17, 1987—A fluid assisted ion projection printing head is disclosed having a U-shaped cavity mated to a planar, conductive member which forms a closure for a major portion of the cavity opening and defines and ion generation chamber and a cavity exit region that is electrically conductive. Ions allowed to exit the printing head are deposited on a dielectric layer coated on an electrically conductive acceleration electrode. A high electric potential of a sign opposite the corona potential of the printing head is connected to the acceleration electrode.

U.S. Pat. No. 4,584,592 to Tuan et al, issued Apr. 22, 1986—A fluid jet assisted ion projection marking apparatus is disclosed including a marking head having integrally fabricated thereon, an array of modulating electrodes, address bus lines, data bus lines and thin film switches. A charge receptor collects ions from the fluid stream in image configuration. The charge receptor overlies a biased conductive accelerating back electrode. The charge receptor may be an insulating intermediate surface such as a dielectric drum.

U.S. Pat. No. 4,410,584 to Toba et al, issued Oct. 18, 1983—An electrostatic recording member is disclosed comprising a recording layer, an electrically conductive layer and a support, wherein the electrically conductive layer is composed if micro-fine powder dispersed in an organic binder and has a surface resistivity of $10^6$ to $10^8$ ohms. The support may be of various shapes and various metallic or polymer materials. The recording layer is dielectric and has a volume resistivity of at least $10^{12}$ ohm.cm preferably at least $10^{14}$ ohm.cm. Dielectric materials such as organic dielectric substances such as polyesters, polycarbonates, polyamides, polyurethanes, (meth)acrylic-type resins, styrene-type resins, polypropylene, etc. or mixtures of inorganic powders, e.g. $TiO_2$, $Al_2O_3$, MgO, etc,. and organic dielectric substances are disclosed. A recording layer thickness of at least $1\mu$, and preferably up to $20\mu$, especially 2 to $6\mu$ are disclosed. Electrostatic latent images are formed on the recording member by needle electrodes. The electrostatic latent image may be developed and the resulting developed image may be transferred to ordinary paper.

U.S. Pat. No. 4,435,066 to Tarumi et al, issued Mar. 6, 1984—An electrostatic reproducing apparatus is disclosed in which the ion flow passing through an ion modulating member is increased by strengthening the electric field between the electrode of the ion modulating electrode and the reproducing member. A dielectric drum and a developing device are also disclosed as employed in the prior art.

U.S. Pat. No. 4,491,855 to Fuji et al, issued Jan. 1, 1985—A method and apparatus are disclosed utilizing a controller having a plurality of openings or slit-like openings to control the passage of charged particles and to record a visible image by charged particles directly on an image receiving member. The charged particles are supported on a supporting member and an alternating field is applied between the supporting member and a control electrode. The image receiving member may, for example, be paper on an electrode.

U.S. Pat. No. 4,474,850 to Burwasser, issued Oct. 2, 1984—An ink jet recording transparency is disclosed comprising a transparent resinous support having a 2–15 micrometer thick coating of a carboxylated, high molecular weight polymer or copolymer, or salts thereof, and optionally, a particulate pigment. Various specific pigments and substituents for the polymer are also disclosed.

U.S. Pat. No. 4,481,244 to Haruta et al, issued Nov. 6, 1984—A material for writing or printing is disclosed comprising a substrate and a coating layer containing a polymer having both hydrophilic and hydrophobic segments. The coating may comprise various polymers prepared from monomers of, for example, styrene, acrylonitrile, vinyl acetate, vinyl chloride, acrylamide, vinylidene chloride, and many other specific materials. A porous inorganic powder, such as zeolites, silica and synthetic mica, may also be incorporated into the coating.

U.S. Pat. No. 4,503,111 to Jaeger et al, issued Mar. 5, 1985—A recording material is disclosed comprising a hydrophobic substrate material with a polymeric coating. The polymeric coating may comprise a mixture of polyvinylpyrrolidone and a compatible matrix forming polymer. Specific coating thicknesses disclosed include 10.16 micrometers (0.40 mil) and 12.7 micrometers (0.5 mil). A final coating of at least 5 micrometers (0.005 mm) is also mentioned.

Thus, while systems utilizing the above-described known approaches may be suitable for their intended purposes, there continues to be a need for the development of an improved process for forming dielectric coatings on ionographic imaging members.

OBJECTS OF THE INVENTION

It is an object of this invention to provide a novel process for fabricating ionographic imaging members which overcomes the abovenoted disadvantages.

It is another object of this invention to provide a process for forming an electroreceptor capable of accepting high levels of electrostatic charges.

It is still another object of this invention to provide a process for forming an electroreceptor coating having a more uniform thickness.

It is another object of this invention to provide a process for forming an electroreceptor coating on a heat sensitive surface.

It is another object of this invention to provide a process for forming an electroreceptor coating on a solvent sensitive surface.

It is still another object of this invention to provide a process for forming an electroreceptor coating having a conductive layer that is more uniformly spaced from the outer surface of the electroreceptor coating.

It is another object of this invention to provide a process for forming an electroreceptor coating having intimate electrical contact with the entire surface area of a conductive substrate.

It is another object of this invention to provide a process for more rapidly forming an electroreceptor coating.

It is another object of this invention to provide a process for forming an electroreceptor coating that has a uniform thickness up to the edge of the coating.

It is still another object of this invention to provide a process for forming an electroreceptor coating that avoids production of undesirable fumes.

It is another object of this invention to provide a process for forming an electroreceptor coating that does not require an anodized surface.

It is still another object of this invention to provide a process for forming an electroreceptor coating that is simple and inexpensive.

SUMMARY OF THE INVENTION

The foregoing objects and others are accomplished in accordance with this invention by providing a flexible, shrinkable tube comprising a dielectric film forming polymer having a Tg of at least about $-40°$ C., charge decay of less than about 2 nanocoulombs per $cm^2$ per second and elastic memory, providing a cylindrical support member having an outer diameter that is less than the inner diameter of the flexible tube, applying a continuous coating on the interior of the tube or on the exterior of the cylindrical support member, the coating comprising a material selected from the group consisting of an electrically conductive material, an adhesive material and mixture thereof, shrinking the tube to bring the inner surface of the tube and the outer surface of the cylindrical support member into intimate physical contact with the continuous coating. The process may include expanding the tube prior to inserting the cylindrical support member within the flexible tube. The cylindrical support member preferably has an electrically conductive outer surface. An electrically conductive compliant layer is preferably deposited on the inner surface of the tube prior to inserting the cylindrical support member within the tube, the tube having a thickness of at least about 17 micrometers after shrinking.

Also included within the scope of this invention is an imaging process comprising providing an electroreceptor comprising a cylindrical support member bearing a shrunken continuous flexible tube around the periphery of the support member, the tube comprising a dielectric thermoplastic film forming polymer, the tube having an outer surface and an inner surface substantially parallel to each other; forming an electrostatic latent image on the outer surface of the tube, the latent image having a developable difference in potential between background areas and image areas; applying electrostatically attractable toner particles to the electrostatic latent image with a developer applicator while supplying a bias potential to the developer applicator whereby toner particles deposit on the imaging surface in image configuration.

In addition, this invention includes an imaging process comprising providing a flexible tube comprising a flexible, shrinkable tube comprising a dielectric thermoplastic film forming polymer, the tube having an outer surface and an inner surface substantially parallel to each other; inserting within the flexible tube a cylindrical support member having an outer diameter that is less than the inner diameter of the flexible tube and having an electrically conductive outer surface; shrinking the tube onto the cylindrical support member; forming an electrostatic latent image on the outer surface of the tube, the latent image having a developable difference in potential between background areas and image areas; applying electrostatically attractable toner particles to the electrostatic latent image with a developer applicator while supplying a bias potential to the developer applicator whereby toner particles deposit on the imaging surface in image configuration.

Any suitable shrinkable dielectric material may be employed in the dielectric imaging tube used in the process of this invention. Shrinkable tubes are well known and arise from elastic or plastic memory properties. Memory may imparted to some polymeric films by any suitable technique such as temporarily stretching an elastomeric material, stretch orientating molecules in a thermoplastic film, inducing cross-linking of molecules in a thermoplastic film through irradiation, and the like. Shrinkage occurs upon release of internal pressure and/or application of heat which causes the tube to revert back to its original state. Deflation of an inflated ballon is an example of shrinkage due to release of internal pressure. In the heat-shrinking embodiment, heat causes the tube to revert back to its original unoriented state. Heat-shrinkable polymeric tubes are well known and described, for example, in U.S. Pat. No. 2,027,962 to Currie and U.S. Pat. No. 3,455,366 to Ellis. The entire disclosures of these patents are incorporated herein by reference. The shrinkable dielectric material may comprise a film forming polymer alone or blended with other suitable additives. Satisfactory results may be achieved with a dielectric film forming polymer having a charge decay of less than about 2 nanocoulombs per $cm^2$ per second and more preferably a charge decay of less than about 0.1 nanocoulombs per $cm^2$ per second. When the charge decay is greater than about 2 nanocoulombs per $cm^2$ per second, the development potential difference between background areas and image areas decreases such that it becomes difficult to produce desirable developed images of high density. Dielectric materials which have a nonuniform decay rate produce developed image variations in print density if the variation becomes a significant portion of the total surface charge density. For example, if the difference in charge density between the image and background areas is 15 to 20 nanocoulombs per $cm^2$ and the development process occurs several seconds after the formation of the latent image, a 2 nanocoulombs per $cm^2$ per second decay rate will produce an undesirable 10 percent variation in the latent image. The dielectric strength of the tube after shrinking is preferably greater than about 20 V/micrometer to ensure that the imaging process does not produce breakdown of the dielectric material and loss of surface charge density or uniformity. Preferably, the shrinkable dielectric tube, as a whole, has, after shrinking, a dielectric constant of from about 1.5 to about 40 and a thickness of at least about 45 micrometers, the thickness divided by the dielectric constant having a value of from about 30 to about 60. If desired, thinner layers as thin as about 17 micrometers (after shrinking) may be used when ion charging or breakdown charging methods other than fluid jet assisted ion stream electrographic imaging techniques are utilized to form the electrostatic latent image. The shrinkable dielectric tube should form a barrier to charge injection at the intimate contact conductive interface with the cylindrical support member and show minimal charge trapping for charges which are injected into the material from this interface or the surface. Typical organic film forming polymers having a dielectric constant of between about 1.5 to about 40 such as those listed in Table 1 below.

TABLE I

| Dielectric Constant (@ $10^6$ cps. or Hz) | DIELECTRIC IMAGING LAYER POLYMERS |
| --- | --- |
| 4 to 6 | Polyurethane |
| 3 to 4.5 | Polyesters |
| 2 to 3 | Polytetrafluoroethylene and other fluorocarbon polymers |
| 2.8 to 3.2 | Polycarbonate |
| 3.1 to 3.7 | Polyarylether |
| 2.5 to 3.4 | Polubutadiene and Copolymers with Styrene, vinyl/toluene, acrylates |
| 3.1 | Polysulfone |
| 3.5 | Polyethersulfone |
| 3.7 | Polyaryl Sulfone |
| 2.2 to 2.6 | Polyethylene and Polypropylene |
| 3.2–4.0 | Polyimide |
| 4.0 | Poly(amide-imide) |
| 3.1 | Polyetherimide |
| 2.12 | Polyethylpentene |
| 3.2 | Polyphenylene Sulfide |
| 2.5 to 3.4 | Polystyrene and Acrylonitrile Copolymers |
| 3.3–4.5 | Polyvinylchloride and Polyvinyl acetate copolymers and terpolymers |
| 2.6 to 3.3 | Silicones |
| 2.1 to 3.5 | Acrylics and Copolymers |
| 2.8 to 4.1 | Alkyd |
|  | Amino |
| 2.8 to 4.0 | Cellulosic resins and polymers |
| 3.3 to 4.0 | Epoxy resins and esters |
| 3.3 to 4.5 | Nylon and Other polyamides |
| 3.8 | Phenoxy |
| 4.5 to 5.0 | Phenolic |
| 2.6 to 3.0 | Phenylene oxide |
| 6.4 to 10.0 | Polyvinylidene fluoride |
| 7.0 to 9.0 | Polyvinyl fluoride |

Other typical organic film forming polymers include, for example, perfluoroalkoxy Teflon, TEFZEL, polyolefins, and the like. The thermoplastic organic polymers should have a $T_g$ that is greater than about $-40°$ C. $T_g$ can be a range or can be a single temperature. Polymeric materials that shrink upon release of internal pressure include elastomeric materials such as natural rubber, synthetic rubbers such as neoprene and butyl rubber, fluoro-elastomers, chlorosulfonated polyethylene, and the like. Of special interest are the various olefins, urethanes, epoxies, acrylates, polyesters, and fluorocarbons, and in mixtures thereof which shrink when heat is applied to form tough abrasion resistant polymeric coatings. These materials are particularly preferred because layers containing these materials exhibit excellent charge acceptance, low charge decay, tough abrasion resistance, and ease of cleanability. Excellent results have been obtained with extruded polyolefin, polyurethane, polyvinylchloride, polyester and fluoro polymers (e.g. PFA). Generally, the tubes employed in the process of this invention should be capable of shrinking in diameter to a size at least 0.1 percent less than the size prior to shrinking. The polymers employed in the tubes may also be cross-linkable. Typical cross-linkable polymers include polyurethanes, expoxies, phenoxys, polyesters, polyamides, polyimides, and the like. These cross-linkable polymers may be cross-linked by any suitable technique, such as by application of heat or activating radiation, during or after the shrinking of the tube around the substrate with or without the addition of suitable crosslinking agents.

If desired, the shrinkable tube may also contain any suitable dissolved or dispersed materials in the dielectric thermoplastic film forming polymer. These dissolved or dispersed materials may include inorganic or organic materials. Typical inorganic materials include barium titanate, transition metal oxides of iron, titanium, vanadium, maganese, or nickel, phosphate glass particles, ceramics, aluminum oxide, zinc oxide, barium oxide, magnesium oxide and the like. Alternatively, or in addition to the inorganic materials, organic materials maybe dissolved or dispersed in the electroreceptor layer. Typical organic materials include charge transport molecules, waxes, stearates, dyes, thermal stabilizers, UV absorbants, anti oxidants, and the like and mixtures thereof. Generally, the shrinkable tube may contain from about 20 percent by weight to about 100 percent by weight film forming polymer and up to about 80 percent by weight of dispersed material, based on the total weight of the dielectric imaging layer. Typical shrinkable tubes include organic polymers containing dissolved or dispersed materials such as barium titanate dispersed in polypropylene, or transition metal (Fe, Ti, V, Mn, Ni) oxide or phosphate glass particles dispersed in a polymer such as polycarbonate, polyester, polyethylene, polysulfone, polyvinyl, polyurethane, nylon, and the like. The shrinkable tubes may also contain various compounds dissolved or dispensed throughout which could aid in improving electrical charge retention or dissipation such as various charge transport molecules. Also, for example, the dissolved or dispersed, organic or inorganic additives could be employed to increase or decrease the dielectric constant of the dielectric shrinkable tubes. By selection of suitable dielectric shrinkable tube materials, the electroreceptor surface may be utilized for triboelectric charging of toners or developers. Moreover, release agents may be incorporated in the dielectric shrinkable tubes to promote toner transfer or removal, e.g. zinc stearate may be added for cleaning. Further, powder fillers may be added to increase compressive strength for transfix properties.

It should also be appreciated that a host of of other dielectric materials are listed in the Handbook of Chemistry and Physics, CRC Press Inc., 1985-1986, 66th Edition, pages E-49 to E-57 and elsewhere which are potentially useful in dielectric shrinkable tubes, and their selection is obvious once the desired conditions stated above are recognized.

The flexible shrinkable tube should have a smooth outer surface and a smooth inner surface substantially parallel to each other for thickness uniformity thereby ensuring achievement of uniform electrostatographic imaging properties at all locations along the length and circumference of the tube. Satisfactory results may be achieved with a tube having a thickness variation of less than about plus or minus 20% and more preferably a point to point thickness variation of less than about plus or minus 5%. When the thickness variation is greater than about 20% the development potential difference between regions which are intended to be similar in density obtain undesirable variation such that developed images are not of uniform density. For example, if the difference in charge density between adjacent areas is 1.5 to 2.0 nanocoulombs per $cm^2$ and the development process is a two component system, variations in density of about 0.2 density units can be observed.

If desired, the dielectric shrinkable tubes may comprise multiple layers of the same or different dielectric materials. Generally, the composite of the multiple layers should, as a whole after shrinking, have a dielectric constant of from about 1.5 to about 40 and preferably a thickness of at least about 45 micrometers, the thickness divided by the dielectric constant having a value of from about 30 to about 60. These values apply to the composite dielectric imaging layer after shrinking has been completed rather than prior to initiation of shrinking. If desired, thinner layer values to about 17 micrometers may be used when ion charging or breakdown charging methods other than fluid jet assisted ion stream electrographic imaging techniques are utilized to form the electrostatic latent image. The uppermost layer may have different properties than the underlying layers. For example, a thin thermoplastic polymer upper layer having a thickness of 2–3 micrometers may be selected for its low dielectric constant property, its excellent stability to wear resistance, and its low surface energy characteristics for improved transfer and cleaning processes.

The thickness of the dielectric shrinkable tube or tubes after shrinking, is preferably at least about 45 micrometers to obtain high resolution and image density. When the thickness of the shrunken dielectric tube is less than about 45 micrometers, surface potential obtained with fluid jet assisted ion projection heads produces low print density when development is effected with conventional two-component dry developer containing carrier particles having an electrically insulating outer surface. Optimum results are achieved when the total thickness of the dielectric tube after shrinking is between about 75 micrometers and about 400 micrometers. If desired, thinner layer values to about 17 micrometers may be used when ion charging or breakdown charging methods other than fluid jet assisted ion stream electrographic imaging techniques are utilized to form the electrostatic latent image.

Any suitable technique may be employed to fabricate the shrinkable tube to the desired wall thickness and diameter and thickness uniformity. Conventional processes for forming tubes include extrusion, casting, spin casting, molding, injection molding, injection blow molding, solution spray coating, powder spray coating, dip coating, electrodeposition, and the like. If the tube thus formed does not meet the desired thickness uniformity or has inner and outer surfaces not substantially parallel, the tube can be processed through secondary operations such as grinding, burnishing, sanding, turning, machining, milling, ablating and buffing, to achieve suitable surface quality and dimentional uniformity. If the secondary operations reduce the thickness of the shrunken tube, e.g. by removal of tube material, the thickness of the tube after completion of the secondary operations should preferably be at least about 17 micrometers. The tube which is formed may be further worked to expand the diameter so that it will fit over a cylindrical metal or conductive roll substrate. For example, one may inflate an elastomeric tube with a pressurized fluid by sealing one end of the tube and introducing pressurized fluid into the interior of the tube through the other end. For example, one may seal the end of a tube by inserting a tapered stopper, or by pinching or heat sealing the end and later trimming the end to fit the substrate. The cylindrical support member can thereafter be inserted within the flexible tube while the tube is in the inflated state. Subsequent removal of the pressurized fluid allows the tube to shrink around the cylindrical support member. One may also expand the diameter of the tube by mechanically stretching the tube over multiple rollers. For example, one may insert a pair of parallel axis rollers of a diameter much smaller than the tube, and while rotating the tube by rotating the rollers, increase the separation of the rollers while heating the tube if necessary. The tube diameter is thus increased to the appropriate size and if necessary cooled before relieving pressure on the rollers. Alternatively, the tube may be heated to a temperature greater than the $T_g$ of the tube polymer prior to, during and/or after expansion and then cooled to a temperature below the $T_g$ of the tube polymer while maintaining the tube in an expanded state to freeze the tube in the expanded state prior to inserting the cylindrical support member within the flexible tube.

One well known method for the preparation of cylindrical objects is centrifugal casting. This process involves rotating a mold or mandrel having a cylindrically shaped cavity about a center axis and introducing a film forming polymer composition in the liquid state into the cavity. The film forming polymer is thereafter solidified to form the desired polymeric tube. Film forming polymer compositions introduced into the cavity may be solidified by any suitable technique to dry or cure the coating. Typical drying techniques include oven drying, infra-red lamp drying, vacuum chamber drying, impingment drying, dielectric heating, and the like. Drying is preferably conducted to minimize the formation of bubbles and stress. The tube is subsequently removed from the mold. The film forming polymer composition may be any suitable solidifiable material which can be cured or dried to a solid state such as, for example, polyurethanes, polyimides, polyamides, polyamide-imides, epoxies, polyesters, polyvinyls, fluoropolymers, and the like. Polymeric seamless tubes of polyamide-imide polymers are particularly preferred because they have a minimum amount of creep at elevated temperatures of about 50° C. and because they form tough flexible films which are further solvent resistant. A similar process is described in U.S. Pat. No. 4,394,340 to Tarumi et al in which a thin-walled endless belt is prepared using a centrifugal mold. The process comprises introducing a liquid curable silicone rubber dissolved in a solvent into a rotating cylindrical mold, hardening the rubber to form a mold surface on the inner surface of the cylindrical mold, and thereafter introducing a thermosetting resin dissolved in a volatile solvent into the mold surface to form the endless belt. The thermosetting resin may be, for example, polyimide, polyamide-imide and polybenzimidazole resins and mixtures of these resins. In a specific example, a formed cylindrical film of polyimide resin is separated from the silicone rubber lining of a centrifugal mold having an inner diameter of 204 mm (after the silicone rubber lining is formed) and the resulting cylindrical film is fitted onto a cylindrical silicone drum having an outer diameter of 204 mm and heated to complete hardening of the polyimide. Since the outer diameter of the formed cylindrical film of polyimide resin is equal to the outer diameter of the cylindrical silicone drum upon which it is mounted for hardening, it is obvious that the cylindrical film of polyimide resin does not shrink during hardening. The completely hardened cylindrical film was taken off the silicone drum to give an endless belt showing that the intention is to remove the belt from the drum which is used soley for support during drying. It is apparent that the hardened cylindrical film of polyimide resin did not shrink during hardening because the hardened cylindrical film of polyimide resin is removable from the cylindrical silicone drum. Also, since the endless belt has a circumferential length of 640 mm the circumference divided by II equals 203.8 or about 204 mm. Thus the process of Tarumi et al differs from the process of this invention in that the belt of Tarumi et al must be mounted around and hardened on a cylindrical silicon drum and thereafter removed from the cylindrical silicon drum whereas the process of this invention permanently mounts a tube onto a cylindrical bulk conductive or conductively coated drum. Moreover, the belt of Tarumi et al does not shrink during heat hardening of the belt on the cylindrical silicone drum whereas the process invention of this invention shrinks a heat shrinkable tube on a cylinder. Further Tarumi et al uses the removed thin walled cylindrical film as an endless transfer belt whereas the integral tube/drum assembly of this invention is employed in an electrostatographic imaging process.

If desired, a suitable release coating may used on the inside of the mold or mandrel. Typical release coatings include silicone resins cured with a catalyst, silicone oil, fluorocarbon oils and resins, waxes, fatty acids and salts, hydrocarbon oils, and the like.

Among the advantages of centrifugal casting are that it is non-complicated, is relatively inexpensive, forms tubes having high surface quality, is capable of utilizing a broad range of materials, utilizes low solvent content, facilitates greater control in obtaining a desired thickness, and is readily adaptable to manufacturing. A process which includes the formation of tubes by centrifugal casing is disclosed in U.S. Pat. No. 4,394,340. The entire disclosure of this patent is incorporated herein by reference.

Because the shrinkable tube may be preformed to precise dimensions prior to application to the cylindrical support member, the thickness of the final electroreceptor dielectric layer may be uniform up to each edge rather than diminishing up to each edge or forming a bulge at the edge or edges due to sag as observed for dielectric layers formed directly on cylindrical support member by spray deposition or dip coating. This allows imaging up to the edge of the final electroreceptor dielectric layer for high quality images. Uniformity of thickness is particularly critical for electroceptors and, for some applications, requires a tolerance as high as about ±2.5 percent. Another advantage of the shrinkable tubes of this invention is that the temperature utilized for shrinking the tube may be selected so that it is less than the temperature needed to drive off the solvent during drying of spray deposited coatings. It is particularly desirable for applying shrinkable dielectric tubes to cylindrical, electrically conductive plastic substrates that are solvent or heat sensitive.

A heat shrinkable tube may also be formed by extrusion of thermoplastic materials such as a polyolefin, polyvinylchloride, and the like, into the shape of a tube. At this stage of fabrication, the inside diameter of the tube may be substantially the same size as the tube after a shrinking treatment. A thermoplastic tube at this stage of fabrication comprises long molecules in a crystalline structure. The thermoplastic tube is thereafter exposed to electron beam bombardment to convert the thermoplastic material into a thermoset material. In the thermoset stage, the long molecules are crosslinked. The crosslinked tube is heated to liquify the crystalline structure. The softened tube is then expanded by suitable techniques such as pressurized air to increase the diameter of the tube. While the tube remains expanded, it is cooled to freeze the tube in its expanded state.

Shrinkable tubing is available from various commercial sources such as the Alpha Wire Corp., Elizabeth, N.J. Heat shrinkable polyolefin tubing from Alpha Wire Corp. typically have an operating temperature range from between about $-55°$ C. to $+135°$ C., a shrinkage ratio of about 2:1 at about 121° C., a tensile strength of about 1,800 p.s.i. nominal, ultimate elongation of about 400 percent, nominal, longitudinal shrinkage of about ±3 percent, a dielectric strength of about 500 volts/mil (197 kV-c), and a volume resistivity of about $10^{14}$ ohms/cm. Other materials available from Alpha Wire Corp. include shrinkable and flexible polyvinylchloride tubes having an operating range of between about $-35°$ C. to about $+105°$ C., a shrinkage ratio of about 2:1 at about 175° C., a tensile strength of about 2,600 p.s.i. [nominal (183 kg/cm$^2$)], ultimate elongation of 250 percent nominal, longitudinal shrinkage of about 10 percent (nominal), a dielectric strength of about 750 V/mil (295 kV/cm), and volume resistivity of about $10^{12}$ ohms/cm. Still other types of shrinkable tubing available from Alpha Wire Corp. include shrinkable nylon tubes having an operating range of between about $-70°$ C. and about $+125°$ C., a shrinkage ratio of about 2:1 at about 180° C., a tensile strength of about 8000 p.s.i. (562 kg/cm$^2$), an ultimate elongation of about 250 percent, longitudinal shrinkage of about 10 percent maximum, dielectric strength of about 800 V/mil (350 kV/cm), and a volume resistivity of about $10^{14}$ ohms/cm; Mylar (polyethylene tetraphalate) tubes having an operating range of between about $-55°$ C. and about $+130°$ C., a shrinkage ratio of about 2:1 at about 120° C., a tensile strength of about 20,000 p.s.i. (1400 kg/cm$^2$), ultimate elongation of about 40 percent, nominal, longitudinal shrinkage of about 10 percent maximum, dielectric strength of about 3000 V/mil (1180 kV/cm), and a volume resistivity of about $10^{15}$ ohms/cm; Kynar tubes having an operating range of between about $-55°$ C. and about $+175°$ C., a shrinkage ratio of about 2:1 at about 175° C., a tensile strength of about 8,000 p.s.i. (5500 kg/cm$^2$), ultimate elongation of about 300 percent (nominal), longitudinal shrinkage of about 5 percent, nominal, dielectric strength of about 1000 V/mil (394 kV/cm), and a volume resistivity of about $2 \times 10^{15}$ ohms/cm; Teflon tubes having an operating range of between about −55° C. and about +269° C., a shrinkage ratio of about 1.5:1 at about 327° C., a tensile strength of about 6,000 p.s.i. (422 kg/cm$^2$), an ultimate elongation of about 600 percent (maximum), longitudinal shrinkage of about 10 percent nominal, and dielectric strength of about 2000 V/mil (787 kV/cm); FEP Teflon (polytetrafluoroethylene) tubes having an operating range of between about −67° C. and about +240° C., a shrinkage ratio of about 1.2:1 at about 136° C., a tensile strength of about 3,100 p.s.i. (220 kg/cm$^2$), an ultimate elongation of about 300 percent, longitudinal shrinkage of about 10 percent, dielectric strength of about 2000 V/mil (77 kV/cm), and volume resistivity of about $2 \times 10^{18}$ ohms/cm; Viton tubes having an operating range of between about −40° C. and about +200° C., a tensile strength of about 1,500 p.s.i. (105 kg/cm$^2$), an ultimate elongation of about 300 percent, longitudinal shrinkage of about 20 percent (maximum), dielectric strength of about 400 V/mil (157 kV/cm), and volume resistivity of about $10^{11}$ ohms/cm; Viton Rubber tubes having an operating range of between about −75° C. and about +200° C., a shrinkage ratio of about 1.7:1 at 130° C., a tensile strength of about 500 p.s.i. (63 kg/cm$^2$), an ultimate elongation of about 325 percent, longitudinal shrinkage of about ±15 percent, maximum, dielectric strength of about 400 V/mil (157 kV/cm), and volume resistivity of about $10^{12}$ ohms/cm; Neoprene tubes having an operating range of between about −70° C. and about +125° C., a shrinkage ratio of about 1.75:1 at 135° C., a tensile strength of about 1800 p.s.i. (127 kg/cm$^2$), an ultimate elongation of about 350 percent, a longitudinal shrinkage of about 6 percent (maximum), a dielectric strength of about 350 V/mil (138 kV/cm), and a volume resistivity of about $10^9$ ohms/cm.

If desired, an optional adhesive layer may be applied to the inner surface of the shrinkable tube in the process of this invention. Any suitable adhesive material may be employed for the optional adhesive layer of this invention. The optional adhesive layer may be substantially electrically insulating, or have any other suitable properties. Typical adhesive materials include polyesters (e.g. Vitel PE-100, available from Goodyear Tire & Rubber Co. and DuPont 4900, available from E. I. du Pont de Nemours & Co.), olefins (e.g. Red Spot Olefin conductive primer, available from Red Spot Paint & Varnish Co., Inc.), polyurethanes (e.g., Polane conductive primer, available from Sherwin Williams Co. and Estane available from B. F. Goodrich Chemical Co.), polyacrylics (e.g. DuPont Acrylics 68070 available from E. I. du Pont de Nemours & Co.), and the like and mixtures thereof. Where the adhesive layer is electrically insulating, it is preferably continuous and has a thickness up to about 3 micrometers. The adhesive layer may also be chosen to act as an electrical blocking layer to prevent charge injection from the substrate into the dielectric coating although thicker adhesive layers may be suitable and desirable in some embodiments. If the optional adhesive layer is electrically insulating, it should be considered as part of dielectric coating for imaging purposes and its dielectric thickness must be considered as part of the dielectric coating. If desired, the adhesive layer may also be electrically conductive as in some of the above materials. Electrical conductivity can also be imparted to the adhesive layer by the addition of conductive particles as described hereafter with reference to the conductive layer. If the shrinkable dielectric tube does not form a complete barrier to charge injection at the intimate contact conductive interface with the cylindrical support member the material a suitable electrical blocking material may be placed at this interface.

A preferred embodiment of this invention is the application of a thin conductive coating to the inside surface of the preformed dielectric polymeric tube. This conductive coating functions as a ground plane in the final electroreceptor and eliminates the need to completely remove any trapped air layer which can lodged between the polymeric tube walls and substrate during the shrinking process. The conductive layer may comprise a material which increases the coefficient of friction between the substrate and shrinkable tube. In operation, the increased friction reduces slippage and turning of the dielectric polymeric tube relative to the substrate on which it is mounted. If desired, the adhesive layer and the conductive layer may be combined into a single layer.

Any suitable electrically conductive material may be employed in the conductive layer. The conductive layer may be, for example, a thin vacuum deposited metal or metal oxide coating, electrically conductive particles dispersed in a binder, electrically conductive polymers such as polypyrrole, polythiophenes, and the like. Typical metals and metal oxides include aluminum, indium, gold, tin oxide, indium tin oxide, antimony tin oxide, silver, nickel, CuI, silver paint, and the like. Typical electrically conductive particles that may be dispersed in a binder include carbon black, aluminum, indium, gold, tin oxide, indium tin oxide, silver, nickel, and the like, and mixtures thereof. The particles should have an average particle size that is less than the dry thickness of the conductive layer. Generally, the conductive layer should be continuous, uniform and have a thickness of between about 0.1 micrometers and about 25 micrometers. Typical binders for conductive particles include polyurethane, polyesters, fluorocarbon polymers, polycarbonates, polyarylethers, polyaryl sulfone, polybutadiene and copolymers with styrene, vinyl/toluene, acrylates, polyether sulfone, polyimide, poly (amide-imide), polyetherimide, polystyrene and acrylonitrile copolymers, polysulfone, polyvinylchloride, and polyvinyl acetate copolymers and terpolymer, silicones, acrylics and copolymers, alkyd, cellulosic resins and polymers, epoxy resins and esters, nylon and other polyamides, phenolic, phenylene oxide, polyvinylidene fluoride, polyvinyl fluoride, polybutylene, polycarbonate co-esters, and the like. The relative quantity of conductive particles added to the binder depends to some extent on the conductivity of the particles. Generally, sufficient particles should be added to achieve an electrical resistivity of less than $10^5$ ohms/square for the final dry solid conductive layer.

Conductive coatings are commercially available from many sources. Typical conductive coating compositions include Red Spot ® Olefin conductive primer (available from Red Spot Paint & Varnish Co., Inc.), Aquadag Alcodag and other "Dag" coatings (available from Acheson Colloids Co.), LE12644 (available from Red Spot Research), (available from Acheson Colloids Co.), Polane ® E67BC24, E75BC23, E67BC17 (available from Sherwin Williams Chemical Coatings), ECP-117 polypyrrole polymer (available from Polariod Corp.), and the like. It is preferred that a conductive and/or adhesive coating be applied to the interior of the shrinkable tube prior to shrinking or coated on the cylindrical support tube prior to being inserted into the shrinkable tube. The conductive and/or adhesive coating should be pliable during the period when the tube is being shrunk to ensure intimate contact between the tube, coating and support.

If desired, any suitable solvent may be employed with the film forming polymer material to facilitate application of the electrically conductive layer or the adhesive layer. The solvent should dissolve the film forming polymer of the conductive layer or the adhesive layer but should not adversely affect the film forming polymer of the shrinkable tube. Typical combinations of film forming polymer materials and solvents or combinations of solvents include polycarbonate (Lexan 4701 available from General Electric Co.) and dichloromethane/1,1,2-trichloroethane, copolyester (Vitel® PE100, available from Goodyear Tire & Rubber Co.) and dichloromethane/1,1,2-trichloroethane, polyester (duPont 49000, available from E. I. du Pont and de Nemours & Co.) and dichloromethane/1,1,2-trichloroethane, polyacrylic (duPont Acrylic 68070 available form E. I. du Pont and de Nemours & Co.) and aromatic hydrocabons, and polyurethane (Estane® 5707FIP, available from B. F. Goodrich Chemical Co.) and tetrahydrofuran/ketone blend, ECP-117 polypyrrole available from Polaroid Corp and alcohols, esters, acetic acid, dimethyl formamide, alone and in blends, and the like.

The conductive layer and/or the optional adhesive layer may be applied to an underlying surface by any suitable coating process. If separate conductive layer and adhesive layers are applied, either may be applied over the other. However, where the coatings are applied onto the interior of a shrinkable tube, the adhesive layer is preferably applied first if the tube is to be shrunk onto a support member having an electrically conductive outer surface. If the conductive layer and/or adhesive layer layer mixture contains a solvent that dissolves an underlying layer, exposure to solublizing solvent should be minimized by suitable means such as through the use non-solvents, brief exposures via spray process, and the like. The underlying surface may be coated and cleared of solvents prior to shrinking the preformed dielectric polymeric tube. Typical coating processes include conventional draw bar, spraying, extrusion, dip, gravure roll, wire wound rod, air knife coating, casting, extrusion, sputtering, powder coating, and the like. The layers applied may be solidified by any suitable technique to dry or cure the layer. Typical drying techniques include oven drying, infra-red lamp drying, vacuum chamber drying, air impingement drying, drying by inductive heating, and the like. Drying is preferably conducted at a rate and level which minimizes the formation of bubbles and stress. The coatings may be applied prior to expanding the dielectric polymeric tube. If desired, the coating may be maintained in a flowable, thixotropic or plasticized state that will better withstand the stresses encountered when the tube shrinks. For example, a prepolymer gel coating may be applied to the tube, the prepolymer being completely polymerized after the tube is shrunk. Alternatively, a prepolymer gel coating may be applied and the prepolymer completely polymerized before the tube is shrunk. The conductive coating ensures that the contiguous surface of the conductive layer is uniformly spaced from the outer surface of the dielectric polymeric tube for uniform electrostatographic imaging properties. When a dielectric tube is shrunk directly onto the conductive surface of a cylindrical support member, air gaps can form between the tube and the surface of a cylindrical support member. These air gaps can adversely affect the uniformity of dielectric thickness of the resulting imaging member in that the distance between the outer surface of the tube and the outer conductive surface of the cylindrical support member varies along and around the tube. Since a conductive coating previously applied to the interior of a shrinkable tube bridges over discontinuities of an uneven conductive substrate surface, the conductive coating embodiment of this invention significantly enhances the uniformity of the imaging properties of the electroreceptor because the thickness of the electroreceptor between the conductive electrode and the imaging surface is uniform along the length and width of the dielectric layer.

Any suitable cylindrical substrate may be employed to support the dielectric heat-shrinkable or flexible tube. The cylinder may be electrically conductive throughout its bulk or merely have a conductive surface. The expression "electrically conductive" as employed herein is defined as a material having an electrical resistivity of less than about $10^5$ ohms/square. Typical cylindrical supporting substrates include metal cylinders; polymeric cylinders; ceramic cylinders; metalized paper, cloth, polymer, composite glass and polymer cylinders; and the like. Cylindrical substrates having a smooth conductive outer surface are preferred because trapped air at the interface is minimized, greater contact area is available for the coating, and slippage is reduced or eliminated. The cylindrical substrates are preferably hollow rigid sleeves to facilitate rapid heating or cooling during fabrication and use. Lightweight cylinders have less inertia and rotation can be more readily started or stopped. However, heavy cylindrical supporting substrates may, for some embodiments, be desired to impart fly wheel like characteristics to the cylinder.

The dielectric shrinkable tube may be applied to the cylindrical substrate by any suitable technique which involves a tube shrinking step. If desired, the dielectric shrinkable tube may be further worked to expand the diameter prior to shrinking so that it will fit over a metal or conductive roll substrate. Further working to expand the diameter prior to shrinking may be effected by any suitable technique including, for example, injecting air or other fluid, inserting a tapered rod having large diameter than the substrate, stretching over two or more rotating rollers which move apart, and the like. Heat may be applied to shrink the dielectric tube coating onto the substrate. Alternatively, the formed polymeric tube may initially be sealed at one end and air injected into the tube to expand the tube sufficiently so that the cylindrical substrate may be inserted. The substrate may thereafter be inserted into the expanded tube and the air subsequently released to collapse the dielectric shrinkable tube around the substrate. A similar process is described in Japanese Patent Publication 16 1277 424 A to Canon KK where an air shrinkable film is fitted over a photoconductive layer which itself is coated on a cylindrical substrate. The process of this invention differs from that of J6 1277 424 A in that in their embodiment the air shrinkable film is used as an overcoat for a photosensitive process and therefore it must be transparent to the wavelengths of light used in the process. Further, the film must be thin enough (about 8 microns) to prevent image resolution loss due to field spreading from the image area below the film to the development area above the film. Further still, a conductive layer on the inside of the air shrinkable dielectric tube would render it unusable on a photoconductive surface since it would electrically short out any image fields. In an embodiment of the instant invention, the dielectric tube may be transparent, translucent, or opaque since it is intended for a process where the image is created by direct deposition of charge to form the latent image. Further the image is created on the top surface of the tube which can therefore be from 17 to about 400 microns thick for ion stream imaging systems and even thicker for other charge deposition writing systems. Still further, in the embodiment of this invention a conductive layer formed by the application of a compliant conductive material at the interface between the cylindrical support tube and the shrinkable dielectric tube is preferred. Heat may be applied to the dielectric shrinkable tube to complete shrinkage around the substrate, if the tube comprises a heat-shrinkable material.

It is generally desired to achieve between about 75 and about 600 volts for good development of the latent image on a dielectric imaging layer utilizing electrophoretic, conductive magnetic brush, or single component development and between about 250 and about 1000 volts for good development of the latent image on a dielectric imaging layer utilizing two component development with insulating carriers.

The dielectric constant of the dielectric imaging layer affects the blooming factor. Charge spreading occurs when the incoming ions are repelled by the field emanating from the receptor towards the ion head created by ions already deposited on the receptor. Field strength in the region above the electroreceptor is determined by the ratio of the dielectric thickness of the region between the ion projection head and the receptor and the dielectric thickness of the receptor. For the same thickness of receiver, the lower dielectric constant causes more spreading. Generally, satisfactory results may be achieved with dielectric imaging layers having a dielectric constant between about 1.5 and about 40. The lower boundry of 1.5 for dielectric constant is currently a material availability boundry. The upper limit of about 40 on the dielectric constant of a film forming polymer is determined by the effects of the dopant used to raise the dielectric constant. The mechanical integrity of the layer is adversely affected by the addition of bulk dopants and adhesive properties of the polymer to the dopant and of the mixture to the substrate. Some high dielectric constant materials are very sensitive to factors such as charge trapping and charge injection. These factors are difficult to control in high dielectric constant materials created by bulk doping of polymers. Moreover, the interface with the substrate becomes more sensitive to charge injection creating the possible need for charge blocking layers. The use of additives can affect batch to batch uniformity of the dielectric imaging layer. For example, a small percentage change in additive content can cause a much greater percentage change in dielectric constant beyond 30 percent loading, because the dielectric constant is a superlinear function of loading. A dielectric constant of between about 2 and about 12 is preferred. Optimum results are achieved with a dielectric constant of between about 2 and about 8.

The dielectric imaging layer should also have a bulk resistivity of at least about $10^{10}$ ohm cm at between about 5 percent to about 80 percent relative humidity and between about 16° C. (60° F.) and about 50° C. (122° F.) because charge movement on the surface of the imaging layer after imagewise discharge results in image blooming. Bulk resistivity below this level also causes charge decay through the dielectric imaging layer decreasing the available image charge level for development.

In regard to thickness of the dielectric imaging layer, thinner dielectric imaging layers can accept charge without excessive spreading. Moreover, less voltage can be impressed on it so that adequate development with two component magnetic brush development with insulating carrier particles is more difficult. Also, the absolute thickness uniformity of the dielectric coating and the tolerances of the substrate surface become more critical with thinner dielectric imaging layers. For example, a 0.25 micrometer thickness variation in a thick 203 micrometer (8 mil) dielectric imaging layer presents less variation of uniformity than a 0.25 micrometer thickness variation in a thin 25 micrometer (1 mil) dielectric imaging layer.

As previously described, the ionographic imaging member prepared by the process of this invention may be utilized in an ionographic imaging process comprising providing the ionographic imaging member comprising a conductive layer and a dielectric imaging layer comprising a film forming polymer, the imaging layer having an imaging surface; uniformly depositing on the imaging surface an electrostatic charge of a first polarity, directing a stream of ions of a polarity opposite the charge of a first polarity to discharge in image configuration the uniformly deposited charge of a first polarity thereby forming an electrostatic latent image on the imaging surface, and depositing electrostatically attractable marking particles on the imaging surface in conformance with the electrostatic latent image while simultaneously applying an electrical bias across the thickness of the dielectric layer and marking particle developer system.

As previously described, a preferred imaging process of imaging on the electroreceptor of this invention comprises providing an ionographic imaging member comprising a conductive layer and a dielectric imaging layer comprising a film forming polymer, the imaging layer having an imaging surface, a dielectric constant of from about 1.5 to about 40 and a thickness of at least about 45 micrometers, the thickness divided by the dielectric constant having a value of from about 30 to about 60; uniformly depositing on the imaging surface an electrostatic charge of a first polarity, directing a stream of ions of a polarity opposite the charge of a first polarity from a head electrically biased to the same polarity as the ions to discharge in image configuration the uniformly deposited charge of a first polarity thereby forming an electrostatic latent image on the imaging surface, and depositing electrostatically attractable marking particles on the imaging surface in conformance with the electrostatic latent image while simultaneously applying an electrical bias of the first polarity across the thickness of the dielectric layer and marking particle developer system.

Imagewise discharging of the uniformly charged imaging surface starting at a satisfactory level of about $-1500$ V with an ion stream should reduce the charge potential on the imaging surface to between about $-1425$ volts and about $-500$ volts to form an electrostatic latent image on the imaging surface having a difference in potential between background areas and image areas of between about 75 volts and about 1000 volts. Selection of surface potential depends on the biasing of suitable developer subsystems, with about 75 to about 600 volts for good development of the latent image on a dielectric imaging layer utilizing electrophoretic, conductive magnetic brush, or single component development and with about 250 to about 1000 volts for good development of the latent image on a dielectric imaging layer utilizing two component development with insulating carriers. Any suitable non-fluid assisted or fluid assisted ion projection printing head may be utilized to imagewise discharge the uniformly charged dielectric imaging layer. Ion projection printing heads are well known in the art. Typical non-fluid assisted ion projection printing heads are described, for example, in U.S. Pat. Nos. 3,976,484, 4,143,965, 4,137,537, 4,168,974, and 4,494,129, the entire disclosures of these patents being incorporated herein by reference. Typical fluid assisted ion projection printing heads are described, for example, in U.S. Pat. No. 4,644,373 to N. Sheridon and G. Sander, U.S. Pat. No. 4,463,363 to R. Gundlach and R. Bergen and U.S. Pat. No. 4,524,371 to N. Sheridon and M. Berkovitz, the entire disclosures of these patents being incorporated herein by reference. Fluid assisted ion projection printing heads are preferred because they do not come into physical contact with the electroreceptor which can cause wear and damage as stylus systems can. Further, fluids assisted ion projection are more efficient and can produce higher resolution images because non fluid assisted systems utilize screens or apertures which restrict ion flow to certain regions of the receptor. As previously described, in a typical fluid assisted ion projection printing head, pressurized air is moved through an ion generation chamber for entraining ions generated in the ion generation chamber and for transporting them through an exit channel or slit including an ion modulation region for subsequent deposition upon the uniformly charged dielectric imaging layer. Generally, the pressurized air is under a pressure of between about 1 inch of water and about 10 inches of water, and preferably between about 3.5 to about 7 inches of water prior to introduction into the ion generation chamber. A corona wire is mounted in the ion generation chamber and high electrical fields are established between the mounted corona wire, maintained at from about 2000 volts to about 6000 volts DC, and the conductive walls of the ion generation chamber. Because the voltage on the corona wire needed to maintain the corona is dependent on the spacing and geometry of the wire and the ion generation chamber, the preferred embodiment is to maintain this voltage by applying a constant current source of about from 0.8 to 2.0 miliamps to the wire. A bias potential of from 0 volts to about 1500 volts DC may be applied to the conductive walls of the ion generation chamber, the polarity of the reference voltage being the same as that of the polarity of the potential applied to the corona wire. As the ions are swept into the exit slit the ion stream is modulated by individually switchable modulation electrodes in thin film element layer, each connected to a voltage source of from about 10 volts to about 400 volts DC, the polarity of the applied potential being chosen to deflect the ions toward or away from the modulation electrodes. The distance between the thin film element layer and cavity wall at the closest point is between about 76 micrometers (3 mils) and about 203 micrometers (8 mils) to provide satisfactory resolution at a reasonable rate of power consumption. Since image resolution depends upon the spots per inch of charge projected to the receiver to produce the electrostatic latent image, the ion streams should be controlled and modulated to less than the spot width. For example, 2700 volts is employed for a 635 micrometer (0.025 inch) exit slit gap to prevent charge spreading as ions traverse the space between the fluid assisted ion projection printing head and the receiver surface. For the channel widths of this magnitude, laminar flow conditions will prevail with the air velocities between about 0.3 CFM and about 3 CFM and preferably between about 1 CFM to about 2.1 CFM. A high potential electrical source between about 0 volts to about 1500 volts DC of a sign opposite to that of the corona potential may be applied to metal layer underlying the dielectric imaging layer. Generally, the fluid assisted ion projection printing head should be spaced from about 150 micrometers and about 1500 micrometers from the imaging surface of the dielectric imaging layer. If the head is too close to the imaging surface, Paschen breakdown occurs and the imaging surface discharges. Although one polarity of charging and discharging has been described here, this invention may equally well be used with all polarities reversed, and/or with development systems utilizing charged or discharged area development with well known choices of development bias and materials.

The electrostatic latent image is then developed with electrostatically attractable marking particles to form a marking particle image corresponding to the electrostatic latent image. The developing (toning) step may be identical to that conventionally used in xerographic imaging. The electrostatically attractable marking particles may be applied, for example, to the electrostatic latent image on a receiver precharged to about −1500 V and imaged to about −650 V with a developer applicator while supplying a bias potential to the developer applicator of between about −1450 volts and about −1300 volts whereby the marking particles deposit on the imaging surface in image configuration to form a marking particle image. Generally, the minimum surface voltage of the image to be developed should be at least about 250 volts when insulating two-component developers are employed and about 75 volts when conductive two-component developers or when single component development systems are used. Conductive single or two-component developers as mentioned here are systems which tend to develop until the electric field above the toned latent image is neutralized while insulating two-component developers systems tend to develop less than 50 percent of the electric field above the latent image.

Any suitable conventional xerographic dry or liquid developer containing electrostatically attractable marking particles may be employed to develop the electrostatic latent image on the electroreceptor of this invention. This invention is particularly effective for development with suitable dry two-component developers containing electrically insulating carrier particles. Two-component developers comprise marking (toner) particles and carrier particles. Typical toner particles may be of any composition suitable for development of electrostatic latent images, such as those comprising a resin and a colorant. Typical toner resins include polyesters, polyamides, epoxies, polyurethanes, diolefins, vinyl resins and polymeric esterification products of a dicarboxylic acid and a diol comprising a diphenol. Examples of vinyl monomers include styrene, p-chlorostyrene, vinyl naphthalene, unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl esters such as esters of monocarboxylic acids, including methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate, and the like; acrylonitrile, methacrylonitrile, acrylamide, vinyl ethers, including vinyl methyl ether, vinyl isobutyl ether, and vinyl ethyl ether; vinyl ketones such as vinyl methyl ketone, vinyl hexyl ketone, and methyl isopropenyl ketone; N-vinyl indole and N-vinyl pyrrolidene; styrene butadienes; mixtures of these monomers; and the like. The resins are generally present in an amount of from about 30 to about 99 percent by weight of the toner composition, although they may be present in greater or lesser amounts, provided that the objectives of the invention are achieved.

Any suitable pigment or dyes may be employed in the toner particles. Typical pigments or dyes include carbon black, nigrosine dye, aniline blue, magnetites, and mixtures thereof, with carbon black being the preferred colorant. The pigment is preferably present in an amount sufficient to render the toner composition highly colored to permit the formation of a clearly visible image on a recording member. Generally, the pigment particles are present in amounts of from about 1 percent by weight to about 20 percent by weight based on the total weight of the toner composition; however, lesser or greater amounts of pigment particles may be present provided that the objectives of the present invention are achieved.

Other colored toner pigments include red, green, blue, brown, magenta, cyan, and yellow particles, as well as mixtures thereof. Illustrative examples of suitable magenta pigments include 2,9-dimethyl-substituted quinacridone and anthraquinone dye, identified in the color index as Cl 60710, Cl Dispersed Red 15, a diazo dye identified in the color index as Cl 26050, Cl Solvent Red 19, and the like. Illustrative examples of suitable cyan pigments include copper tetra-4-(octadecyl sulfonamido) phthalocyanine, X-copper phthalocyanine pigment, listed in the color index as Cl 74160, Cl Pigment Blue, and Anthradanthrene Blue, identified in the color index as Cl 69810, Special Blue X-2137, and the like. Illustrative examples of yellow pigments that may be selected include diarylide yellow 3,3-dichlorobenzidene acetoacetanilides, a monoazo pigment identified in the color index as Cl 12700, Cl Solvent Yellow 16, a nitrophenyl amine sulfonamide identified in the color index as Foron Yellow SE/GLN, Cl Dispersed Yellow 33, 2,5-dimethoxy-4-sulfonanilide phenylazo-4'-chloro-2,5-dimethoxy aceto-acetanilide, Permanent Yellow FGL, and the like. These color pigments are generally present in an amount of from about 15 weight percent to about 20.5 weight percent based on the weight of the toner resin particles, although lesser or greater amounts may be present provided that the objectives of the present invention are met.

When the pigment particles are magnetites, which comprise a mixture of iron oxides ($Fe_3O_4$) such as those commercially available as Mapico Black from Columbian Division, Cities Services, Inc., Akron, Ohio, these pigments are present in the toner composition in an amount of from about 10 percent by weight to about 70 percent by weight, and preferably in an amount of from about 20 percent by weight to about 50 percent by weight, although they may be present in greater or lesser amounts, provided that the objectives of the invention are achieved.

The toner compositions may be prepared by any suitable method. For example, the components of the dry toner particles may be mixed in a ball mill, to which steel beads for agitation are added in an amount of approximately five times the weight of the toner. The ball mill may be operated at about 120 feet per minute for about 30 minutes, after which time the steel beads are removed. Dry toner particles for two-component developers generally have an average particle size between about 8 micrometers and about 15 micrometers. Typical dry toners for two-component developers are disclosed, for example, in U.S. Pat. No. 2,788,288, U.S. Pat. No. 3,079,342 and U.S. Pat. No. Re. 25,136, the disclosures of which are incorporated herein in their entirety. Dry toner particles for single component developers generally have an average particle size of between about 6 micrometers and 25 micrometers. Typical toners for single toner developers include, for example, Xerox 1012 Toner for the Xerox 1012 machine, and Canon NP 3000 Toner or Canon universal toner for the Canon NP-210, NP-300, NP-400, and NP-500 machines.

Any suitable external additives may also be utilized with the dry toner particles. The amounts of external additives are measured in terms of percentage by weight of the toner composition, but are not themselves included when calculating the percentage composition of the toner. For example, a toner composition containing a resin, a pigment, and an external additive may comprise 80 percent by weight resin and 20 percent by weight pigment; the amount of external additive present is reported in terms of its percent by weight of the combined resin and pigment. External additives may include any additives suitable for use in electrostatographic toners, including straight silica, colloidal silica (e.g. Aerosil R972 ®, available from Degussa, Inc.), ferric oxide, unilin, polypropylene waxes, polymethylmethacrylate, zinc stearate, chromium oxide, aluminum oxide, stearic acid, polyvinylidene fluoride (e.g. Kynar ®, available from Pennsalt Chemicals Corporation), and the like. External additives may be present in any suitable amount, provided that the objectives of the present invention are achieved.

Any suitable carrier particles may be employed with the toner particles. Typical carrier particles include granular zircon, steel, nickel, iron ferrites, and the like. Other typical carrier particles include nickel berry carriers as disclosed in U.S. Pat. No. 3,847,604, the entire disclosure of which is incorporated herein by reference. These carriers comprise nodular carrier beads of nickel characterized by surfaces of reoccurring recesses and protrusions that provide the particles with a relatively large external area. The diameters of the carrier particles may vary, but are generally from about 50 microns to about 1,000 microns, thus allowing the particles to possess sufficient density and inertia to avoid adherence to the electrostatic images during the development process. Carrier particles may possess coated surfaces. Typical coating materials include polymers and terpolymers, including, for example, fluoropolymers such as polyvinylidene fluorides as disclosed in U.S. Pat. Nos. 3,526,533; 3,849,186; and 3,942,979, the entire disclosures of which are incorporated herein by reference. The toner may be present, for example, in the two-component developer in an amount equal to about 1 to about 5 percent by weight of the carrier, and preferably is equal to about 3 percent by weight of the carrier. The carrier, either coated or uncoated, may have an electrically insulating or electrically conductive outer surface. The expression "electrically insulating" as employed herein is defined as having a bulk resistivity of at least about $10^{12}$ ohm cm. Heretofore, as indicated above, electrostatic latent images formed by directing a stream of ions onto a dielectric layer could not form dense, high resolution images when developed with two-component developer containing carrier particles having an electrically insulating outer surface. Typical dry toners are disclosed, for example, in U.S. Pat. No. 2,788,288, U.S. Pat. No. 3,079,342 and U.S. Pat. No. Re. 25,136, the disclosures of which are incorporated herein in their entirely. If desired development may be effected with liquid developers. Liquid developers are disclosed, for example, in U.S. Pat. No. 2,890,174 and U.S. Pat. No. 2,899,335. Liquid developers may comprise aqueous base or oil based inks. This includes both inks containing a water or oil soluble dye substance and the pigmented inks. Typical dye substances are Methylene Blue, commercially available from Eastman Kodak Company, Brilliant Yellow, commercially available from the Harlaco Chemical Co., potassium permanganate, ferric chloride and Methylene Violet, Rose Bengal and Quinoline Yellow, the latter three available from Allied Chemical Company, and the like. Typical pigments are carbon black, graphite, lamp black, bone black, charcoal, titanium dioxide, white lead, zinc oxide, zinc sulfide, iron oxide, chromium oxide, lead chromate, zinc chromate, cadmium yellow, cadmium red, red lead, antimony dioxide, magnesium silicate, calcium carbonate, calcium silicate, phthalocyanines, benzidines, naphthols, toluidines, and the like. The liquid developer composition may comprise a finely divided opaque powder, a high resistance liquid and an ingredient to prevent agglomeration. Typical high resistance liquids include such organic dielectric liquids as Isopar, carbon tetrachloride, kerosene, benzene, trichloroethylene, and the like. Other liquid developer components or additives include vinyl resins, such as carboxy vinyl polymers, polyvinylpyrrolidones, methylvinylether maleic anhydride interpolymers, polyvinyl alcohols, cellulosics such as sodium carboxy-ethylcellulose, hydroxypropylmethyl cellulose, hydroxyethyl cellulose, methyl cellulose, cellulose derivatives such as esters and ethers thereof, alkali soluble proteins, casein, gelatin, and acrylate salts such as ammonium polyacrylate, sodium polyacrylate, and the like.

If desired development may be effected with any suitable liquid developer. Liquid developers are disclosed, for example, in U.S. Pat. No. 2,890,174 and U.S. Pat. No. 2,899,335, the disclosures of these patents being incorporated herein in their entirety. Typical liquid developers may comprise aqueous based or oil based inks. This includes both inks containing a water or oil soluble dye substance and pigmented inks. Typical dye substances include Methylene Blue, commercially available from Eastman Kodak Company, Brilliant Yellow, commercially available from the Harlaco Chemical Co., potassium permanganate, ferric chloride and Methylene Violet, Rose Bengal and Quinoline Yellow, the latter three available from Allied Chemical Company, and the like. Typical pigments are carbon black, graphite, lamp black, bone black, charcoal, titanium dioxide, white lead, zinc oxide, zinc sulfide, iron oxide, chromium oxide, lead chromate, zinc chromate, cadmium yellow, cadmium red, red lead, antimony dioxide, magnesium silicate, calcium carbonate, calcium silicate, phthalocyanines, benzidines, naphthols, toluidines, and the like. The liquid developer composition may comprise a finely divided opaque powder, a high resistance liquid and an ingredient to prevent agglomeration. Typical high resistance liquids include organic dielectric liquids such as Isopar, carbon tetrachloride, kerosene, benzene, trichloroethylene, and the like. Other liquid developer components or additives include vinyl resins, such as carboxy vinyl polymers, polyvinylpyrrolidones, methylvinylether maleic anhydride interpolymers, polyvinyl alcohols; cellulosics such as sodium carboxy-ethylcellulose, hydroxypropylmethyl cellulose, hydroxyethyl cellulose, methyl cellulose, cellulose derivatives such as esters and ethers thereof; alkali soluble proteins, casein, gelatin; acrylate salts such as ammonium polyacrylate, sodium polyacrylate; and the like.

Any suitable conventional xerographic development technique may be utilized to deposit toner particles on the electrostatic latent image on the imaging surface of the dielectric imaging members of this invention. Well known xerographic development techniques include, magnetic brush, cascade, powder cloud, liquid and the like development processes. Magnetic brush development is more fully described, for example, in U.S. Pat. No. 2,791,949, cascade development is more fully described, for example, in U.S. Pat. No. 2,618,551 and U.S. Pat. No. 2,618,552, powder cloud development is more fully described, for example, in U.S. Pat. No. 2,725,305 and U.S. Pat. No. 2,918,910, and U.S. Pat. No. 3,015,305, and liquid development is more fully described, for example, in U.S. Pat. No. 3,084,043. All of these toner, developer and development technique patents are incorporated herein in their entirety.

When a magnetic brush developer applicator is employed for development, the development subsystem employed to apply the developer to the imaging surface of this invention is preferably run at a greater speed than one utilized for high charge xerographic systems. Thus, the direction of rotation of developer applicator rolls is preferably concurrent with the electroceptor direction and the surface speed is about 3 to about 6 times the speed of the electroceptor with optimum between about 4 and about 5 times the electroceptor speed. This compares to a surface speed for developer applicator rolls of 2 to 3 times that of a photoreceptor in common usage for nominal charge light and lens xerographic systems. The higher ratio compensates for the lower charge density in the latent image from the ion projection head and provides more toner per unit time in the development zone. Although developability is equivalent in both cases of with and against development roll directions for these higher speed ratios, some bead loss and scavenging can occur if the developer roll is run in the direction counter to the electroceptor direction. When it is desired that the developed image comprise an image developed corresponding to the areas of charge, it is generally preferred to pass in contact therewith a developer which is triboelectrically charged to a polarity opposite to the retained charge of the latent image whereby the developer is attracted and adheres to the charged areas of the insulative image pattern. However, when it is preferred that a developed image corresponding to the uncharged (discharged) areas be reproduced, it is the general practice to employ developer charged to the same polarity as the image charge pattern. The developer will then be repelled by the charges of the latent image and will deposit on the non-charged (discharged) areas of the imaging member with the charged areas remaining absent of developer.

Image density is enhanced by the use of a development electrode. Development electrodes are widely used in the field of electrophotography. Depending upon the particular development technique employed, the development electrode may exist as part of the developer applicator or as a separate electrode closely spaced from the imaging surface of the dielectric imaging layer. For example, the development electrode may be a cylindrical applicator for applying two-component magnetic developer to the electrostatic latent image on the imaging surface of the dielectric imaging layer. The development electrode may be of any suitable shape. Typical development electrode shapes include cylinders, flat and arcuate plates, segmented flat and arcuate plates, and the like. Satisfactory results may be achieved with a development electrode to dielectric imaging layer surface distance of between about 250 and about 2500 micrometers for dry two-component developers and of between 75 and 1000 micrometers for single component development systems. The lower limit for dry two-component developers is limited by the bead size and the magnetic brush rigidity. The upper limit is determined by the ratio of the dielectric thicknesses of the development zone and the electroreceptor such that the electrode is effective in bringing the field into the region between the development electrode and the surface of the receptor. For single component development systems, the separation limits are set by the size of the toner for contact systems and by the height of the projected toner for jumping and cloud type systems. A high potential electrical source of between about 40 volts DC and about 300 volts DC of a sign opposite to that of the corona potential, may be applied to the development electrode to achieve satisfactory image density. The lower limit of the developer bias is set by the tendency of some development systems to deposit toner in the background areas of the images when the reverse or cleaning field is below about 40 V above the background voltage. The upper limit is determined by the loss of developability caused by decreasing the contrast voltage available.

In a typical example, the charge attained from an ionographic imaging system utilizing a fluid jet assisted ion projection head can be about 17 to about 20 nanocoulombs/cm$^2$ at a 2 in/sec imaging layer surface speed. For a desired contrast voltage of about 850 volts, a polycarbonate dielectric imaging layer material having a thickness of about 125 micrometers (5 mils) and a dielectric constant of 3.1 can be used. To achieve this potential, depending on thickness of the dielectric layer, the dielectric constant can range from about 1.5 to about 12 or even higher. The thickness divided by the dielectric constant can be about 40 to 54 optimum, but 30 to 60 has been found to be the range for satisfactory results in this material and in other materials with dielectric constants ranging from about 1.5 to about 12 or even higher for development with dry two-component developer containing carrier particles having an electrically insulating outer surface. If, for example, the dielectric constant is 7 as for polyvinyl fluoride (Tedlar, available from E. I. du Pont de Nemours & Co.), then the optimum thickness range is from about 280 micrometers (11 mils) to about 378 micrometers (15 mils) or about 11 to 15 times greater than the 25 micrometer (1 mil) thickness described in U.S. Pat. No. 4,410,584. The foregoing calculations were performed for optimum parameters based on a fluid jet assisted ion projection head that deposits a charge ranging from about 15 to about 30 nanocoulombs per cm$^2$. Although this is a typical example, the thickness ranges here are limited by the desired contrast voltage for this fluid jet projection head and are not intended to show a limit on the capabilities of the process to form a imaging members of greater or lesser thicknesses as described herein for other image charging methods.

Any suitable means may be used to transfer the developed image from the surface of the imaging member to the transfer or copy sheet representing the final copy. A particularly useful and generally preferred method of carrying out the transfer operation comprises an electrostatic transfer technique wherein a transfer sheet is placed in contact with the image bearing surface and an electric charge applied to the reverse side of the transfer sheet by, for example, an adjacent ion source such as a corona discharge electrode or other similar device placed in juxtaposition to the transfer member. Such an ion source may be similar to the source employed during a charging step of a conventional xerographic imaging process and is maintained at a high electrical potential with respect to the image bearing imaging member. Corona discharge results in the deposition on the transfer sheet of ionized particles which serve to charge the sheet. The transfer sheet will be charged to a polarity opposite to that of the developed image and such charge is strong enough to overcome the potential initially applied to the surface of the imaging member. A single wire corotron having applied thereto a potential of between about 3000 and about 7000 volts provides satisfactory transfer. Adhesive pick off is another form of image transfer that may be used. The electrostatic transfer process is preferred in order to obtain maximum image transfer while retaining high image resolution. When liquid developers are employed a more generally preferred method of image transfer is that of applying contact pressure when the transfer sheet is brought into surface contact with the developed image.

Any suitable material may be used as the transfer or receiving sheet for the developed image during the imaging process. The copy material may be insulating in nature or partially conductive. Typical materials are polyethylene, polyvinylchloride, polyvinyl fluoride, polypropylene, polyethylene terephthalate, ordinary bond paper, and the like.

The image transferred to the surface of the transfer or receiving sheet may be fixed to its support by any suitable means such as vapor fusing, heated roll fusing, flash fusing, or oven fusing of the developed image with a regulated amount of heat or by a lamination process. It is preferred to use the heat fixing technique in conjunction with toner developed images inasmuch as it allows for a high degree of control of the fixing phase of the process. When liquid developers have been used fixing is achieved by allowing for the evaporation of the relatively volatile carrier fluids utilized. Thus, the fixing step may be identical to that conventionally used in xerographic imaging.

The imaging member may optionally be erased by any suitable technique such as exposing the imaging surface to AC corona discharge to neutralize any residual charge on the imaging member. Typical potentials applied to an AC corona erasing device range from about 3000 volts and about 6000 volts.

If desired, the imaging surface of the imaging member may be cleaned. Any suitable cleaning step that is conventionally used in xerographic imaging may be employed for cleaning the imaging member of this invention. Typical, well known xerographic cleaning techniques include brush cleaning, web cleaning, blade cleaning, and the like.

After transfer of the deposited toner image from the imaging member to a receiving member, the imaging member may, with or without erase and cleaning steps, be cycled through additional electrostatic latent image forming, development and transfer steps to prepare additional imaged receiving members.

Although formation of an electrostatic latent image by utilization of a fluid assisted ion stream system for imagewise discharge of uniformly precharged electroceptors is particularly preferred to achieve surface voltages and high electrostatic fields suitable for development with any kind of developer, including standard, dry two-component developers to achieve image densities of at least about 0.7, satisfactory results may be achieved with other types of developers, such as liquid or single component conductive developers, where the electrostatic latent image is formed on an electroceptor by an ion stream with or without any prior uniform charging step.

Unlike prior art processes for fabricating electrographic dielectric imaging layers, the process of this invention forms dielectric imaging layers that avoid the uneven and orange peel effects that can occur in spray coating of thick coatings and pinholes and other defects that can occur in thin coatings. Moreover, solvent handling, toxicity and contamination difficulties common to spray coating can be avoided. No special clean room to eliminate contaminants is required. Also, material loss due to overspray need not be encountered. Further, the process of this invention can be carried out quickly without extended drying and/or curing times. In addition, cylindrically shaped dielectric layers having a uniform thickness from edge to edge may be achieved with the process of this invention. Further, the process of this invention allows one to easily select the desired length of the final dielectric coating so that it is shorter than, the same length as, or even longer than the cylindrical substrate. In the latter embodiment, the coating will shrink over the edge to a diameter smaller than that of the outer diameter of the substrate and provide a coated edge. Solvents or high heat may easily be avoided when solvent or heat sensitive substrates are employed. If it becomes necessary to remove the coating of this invention, methods such as solvent dissolution, sandblasting, lathing, and grinding are not necessary since the materials can be mechanically peeled or cut from the substrate for separate recovery or disposal. Moreover, the process of this invention forms an electroceptor coating having a conductive layer that is more uniformly spaced from the outer surface of the electroceptor coating.

The invention will now be described in detail with reference to specific preferred embodiments thereof, it being understood that these examples are intended to be illustrative only. The invention is not intended to be limited to the materials, conditions, or process parameters recited herein. All parts and percentages are by weight unless otherwise indicated.

EXAMPLE I

A polyurethane polymer seamless tube having a thickness of about 210 micrometers, a length of about 45 cm and a dielectric constant of about 3.8 at $10^6$ Hz was prepared by Belting Industries Co., Inc., Boulder Colo. The polyurethane polymer seamless tube had an internal diameter of about 6.2 cm. It is believed that the polyurethane polymer seamless tube was prepared by casting liquid polyurethane polymer in a centrifugal mold. Generally, in centrifugal molding, a hollow cylindrical mold may be rotated about a center axis and the material for the tube to be formed is introduced in a liquid state onto the inside surface of the mandrel. Centrifugal force caused by rapid rotation of the cylindrical mold maintains and levels the polymer against the inside surface of the mold. By appropriate selection of polyurethane material and interior dimensions of the cylindrical mold, the tube can be made to have a thickness of about 210 micrometers, a length of about 45 cm, an internal diameter of about 6.2 cm. The thickness of the cast tube can be made uniform from edge to edge by placement of a dam at each edge of the centrifugal mold to retain the polymer during rotation of the mold. The cast tube can then be stripped from the mold after it was partially or fully cured. The tube thus prepared can then be softened by heating to a temperature greater than the glass transition temperature of the polyurethane material ($T_g$ about 65° C. to 85° C.), for example, about 125° F. (51.7° C.), and drawn over a tapered Teflon rod, the larger end having a diameter of 6.6 cm. Drawing may be facilitated by gripping one end of the softened tube and pulling it over and around the tapered Teflon rod. As the expanded tube is drawn past the larger end of the tapered Teflon rod, it should be cooled to a temperature below the Tg of the polymer to freeze it in the expanded state so that it retains an inside diameter of 6.6 cm upon removal from the rod. Removal of the tube from the rod may be accomplished by gripping one end of the tube and pulling it off from one end of the rod. A 5 percent by weight dispersion of a conductive polymer (ICP-117, available from Polaroid Corp. as described in U.S. Pat. No. 4,724,053) in butyl acetate was applied to the inner surface of the polyurethane tube by flow coating. ICP-117 comprises a polypyrrole polymer complex having a bulk conductivity of about $4 \times 10^{-1} \pm 0.2$ (ohm$^{-1}$ cm$^{-1}$) as measured by the standard 4-probe technique and has a surface resistance is $10^4$ to $10^8$ ohms/sq depending on thickness. The deposited coating was then dried with forced warm air at about 100° F. (37.8° C.) for about 10 minutes. After drying, the conductive coating had a thickness of about 3 micrometers. While the tube remained frozen in the expanded state, a hollow aluminum drum having an outside diameter of about 6.4 cm, a length of about 23 cm, and a thickness of about 4 mm was inserted into the interior of the conductively coated polyurethane shrinkable tube. The covered aluminum drum was then placed in an oven and heated to a temperature above the previous 125° F. (51.7° C.) tube expansion temperature to about 200° F. (93.3° C.) for about 20 minutes to shrink the tube toward its original dimensions, complete curing of the polyurethane and polymer if required and firmly compress the conductive coating against the surface of the aluminum drum. Since the tube was longer than the substrate after inserting the substrate and shrinking the tube, the excess tube material was cut away with a knife. The final coating thickness after shrinking was about 7.8 mils. The resulting electrographic imaging member was substituted for the xerographic drum in a Xerox 2830 xerographic copier which utilizes magnetic brush development. The Xerox 2830 xerographic copier, prior to modification, comprised an electrophotographic drum around the periphery of which are mounted a charging station to deposit a uniform electrostatic charge, an exposure station, a magnetic brush development station, a paper sheet feeding station, an electrostatic toner image transfer station, and a toner image fusing station, and a blade cleaning station. The Xerox 2830 xerographic copier was modified to substitute a fluid jet assisted ion projection head similar to the head for the exposure station of the copier. The magnetic brush developer employed comprised toner particles having an average particle size of about 12 micrometers and comprising a styrene copolymer pigmented with about 10 percent carbon black and carrier particles having an average size between about 50 and about 100 micrometers comprising uncoated semiconductive ferrite particles. The magnetic brush developer also contained minor amounts of an external additive comprising zinc stearate and colloidal silica particles. The type of ion projection head substituted for the exposure system comprised an upper casting of stainless steel having a cavity. A pair of extensions on each side of the head formed wiping shoes which rode upon the outboard edges of the dielectric image layer to space the ion projection head about 760 micrometers from the imaging surface of dielectric image layer. An exit channel including a cavity exit region was about 250 micrometers (10 mils) long. A large area marking chip comprising a glass plate upon which was integrally fabricated thin film modulating electrodes, conductive traces and transistors was used for modulation of the ion stream at the exit channel. The width across the cavity was about 3175 micrometers (125 mils) and a corona wire was spaced about 635 micrometers (25 mils) from each of the cavity walls. A high potential source of about +3,600 volts was applied to the corona wire through a one megohm resistance element and a reference potential of about +1,200 volts was applied to the cavity wall. Control electrodes of an individually switchable thin film element layer (an array of 300 control electrodes per inch) on the large area marking chip were each connected through standard multiplex circuitry to a low voltage source of +1,220 volts or +1,230 volts, 10 to 20 volts above the reference potential. Each electrode controlled a narrow "beam" of ions in the curtain-like air stream that exited from an ion modulation region in the cavity adjacent the cavity exit region. The conductive electrodes were about 89 micrometers (3.5 mils) wide each separated from the next by 38 micrometers (1.5 mils). The distance between the thin film element layer and cavity wall at the closest point was about 75 micrometers (3 mils). Laminar flow conditions prevailed at air velocities of about 1.2 cubic feet per minute. The metal drum of each of the tested samples was electrically grounded. In operation, the imaging surface on the dielectric imaging layer on each electrographic drum was uniformly charged to about −1500 volts at the charging station, imagewise discharged to −750 volts with the ion stream exiting from the fluid jet assisted ion projection head to form an electrostatic latent image having a difference in potential between background areas and the image areas of about 750 volts, and developed with toner particles deposited from the two-component magnetic brush developer applied at the magnetic brush development station biased at about −1450 volts.

The dielectric materials, mounted on cylindrical substrates, were further tested by rotating the substrates under a constant current ion source, i.e. a single wire corotron in which the receiver current to the corotron wire was controlled by a Trek 610B Corotrol. In the calculations below, the surface charge density $\sigma$ is the charge per unit area deposited under the constant current charging assuming that, for the 5 cm wide corotron used in these experiments, the charge spreading was less than 5 percent of the charge at the edges and does not appreciably affect the charge density under the center of the corotron. Each rotation of the substrate subjected the dielectric material to uniform charging. The surface potential of the dielectric material was measured by a Trek 565 non-contact electrometer. Measurement of the slope of the surface voltage versus surface charge density is derived from the following expression $$\sigma = \frac{q}{A} = \left(\frac{K\epsilon_o}{d}\right)V$$

gives the dielectric thickness of the device.

$$\left(\frac{d}{K\epsilon_o}\right)$$

Where q is total charge, A is surface area charged, and V is the surface voltage measured. When the physical thickness, d, is measured with either a Twin City International, Inc. Autotest Permascope or micrometer caliper, the dielectric constant $K\epsilon_o$ is determined. Effective dielectric constant is a measure of the surface voltage (V) reached by corona charging to a known surface charge level (a value of $\sim 18$ ncoul/cm$^2$, after a known decay time, $\sim 1$ second in these experiments). This gives the actual voltage one might expect to obtain using entrained air ion charging of the receptor in an imaging machine configuration. The Belting Industries polyurethane sleeve showed low injection and low charge trapping and low decay rates. Values of charge decay of less than 5 volts in 20 seconds for 1 KV on an 8 mil coating were considered very good. Charges injected into the bulk of the dielectric either from the substrate or from the free surface and which are trapped in the bulk appear in this measurement as a higher effective dielectric constant. Injected charges are harmful to the imaging process because they will move back toward the surface after image formation by an ion stream and will decrease the contrast voltage. The injection and trapping was measured by charging the dielectric material with a corona to a high level of $\sim 20$ V per micron of dielectric thickness, holding that level for one minute, discharging the dielectric (with brush or scorotron-corona) to zero surface potential, and measuring the increase in surface potential as trapped charges migrate to the surface. The time rate of voltage charge and the magnitude of the resultant surface charge indicated how adversely an image could be affected. Voltage charges of 500 V (up to ½ the initial charge level) were seen in dielectric materials like polyvinylfluoride. The device of this example, the polyurethane coating, shows no measurable (less than 5 V) charge injection or trapping effects. Electrical and print test results indicated that variation in voltage around the drum was less than about 40 V out of 850 V, charge decay was less than about 3 V per second, print density was greater than about 1.2 and the image resolution was equal to the resolution of the ion head at about 300 lines per inch.

The developer housing of the modified Xerox 2830 Machine was purged of the two component developer material and loaded with a developer consisting of single component toner particles. The toner particles comprised a styrene copolymer pigmented with carbon black and magnetite and had an average particle size of about 12 micrometers. The developer housing was spaced about 10 mils (254 micrometers) from the dielectric imaging surface. An electrostatic latent image was formed on the dielectric imaging layer as described above and developed with the single component developer. The images produced had a density of about 1.0, resolution of 300 spots per inch, clean background, and no discernable image blooming.

EXAMPLE II

It is believed that results similar to those obtained in Example I would be achieved if the aluminum substrate is coated with a conductive composition comprising about 15 weight % of Black Pearls 2000 Carbon Black available from Cabot Corp. in a polyester binder (49000, available from E.I. duPont de Nemours and Co.) having a thickness of about 4 microns. When the substrate is then inserted into the interior of the tube and the expanded tube is shrunk on the substrate when heated to 200° F. (93.3° C.) for 20 minutes and also to complete the polyurethane cure. Electrical and print tes results essentially identical to those described in Example I would be expected.

EXAMPLE III

It is believed that similar results will be obtained if the procedures described in Example I are repeated with substantially identical steps and materials except that the inner surface of the polyurethane tube is coated with Red Spot Olefin black conductive primer LE12644 (available from Red Spot Research) instead of the conductive coating ICP-117 prior to shrink mounting the tube on an aluminum drum substrate. The olefinic conductive coating is applied by brushing. After drying, the conductive coating has a thickness of about 5 micrometers. Electrical and print tests results essentially identical to those described in Example I would be expected.

EXAMPLE IV

It is believed that similar results will be obtained if the procedures described in Example III are repeated with substantially identical steps and materials except that the inner surface of the polyurethane tube is coated with Polane black conductive primer E67BC24, available from Sherwin Williams Co., prior to shrink mounting the tube on an aluminum drum substrate. Conductive primer E67BC24 is a black conductive two-component polyurethane primer containing about 63 percent by weight solids and catalyzed with isocyanate catalysts. The conductive coating may be applied by flow coating. After drying, the conductive coating has a thickness of about 8 micrometers. Electrical and print test results essentially identical to those described in Example I would be expected.

EXAMPLE V

The procedures described in Example I were repeated with substantially identical steps except that a polyurethane composition pigmented with about 10 percent by weight $BaTiO_3$ is used to prepare the tube. The tube after drying has a thickness of about 355 micrometers and a dielectric constant of about 6.7. Electrical and print tests identical to those described in Example I indicate good charge properties, charge decay rates of about 5 volts/second, and excellent prints with image density of about 1.0.

EXAMPLE VI

Heat shrinkable polyvinyl chloride (PVC) seamless tubing was used by Deversitech General Inc, Ohio to cover an aluminum drum having outside diameter of about 84 mm and a length of about 25.4 cm. It is believed that the PVC tubing is about 1.5 inches longer at each end than the aluminum drum prior to shrinking. The PVC covered drum is placed in a forced hot air oven at 125° C. for about 0.5 hrs. to shrink the tubing onto the drum. Excess PVC tubing was trimmed to be even with the drum ends. The thickness of the PVC tubing after shrinkage was about 1.27 mm which was then ground and polished to obtain a final thickness of about 300 $\mu$m. The dielectric constant of the PVC was about 4.2. The resulting electrographic drum was installed into the test machine of Example I except that the interactive components are spaced to accommodate the increased diameter of the drum. Test results indicate that the voltage variation around the drum was about ±80 volts and that image resolution was good but image density varied from about 0.5 to about 0.7.

EXAMPLE VII

The procedures of Example VI were repeated with substantially identical steps except that the aluminum drum was spray coated with about a 6 $\mu$m thick conductive coating comprising about 15 percent by weight carbon black pigment dispersed in vinyl chloride copolymer binder. The conductive coating on the drum constitutes a releasable layer which will preferentially adhere to the PVC (Polyvinylchloride) seamless tubing rather than to the aluminum drum. The conductive layer when heated with the heat shrink polyvinyl chloride tubing thus adheres to the PVC under the heat shrink conditions and produces a more intimate contact with the dielectric layer. The PVC tubing was ground and polished as described in Example VI and tested in the modified Xerox 2830 fixture. Test results indicated that the voltage variation around the drum was about ±45 volts, image resolution and print density were good.

EXAMPLE VIII

An extruded heat shrinkable perfluoroalkoxy Teflon polymer seamless tube prepared by Bunnell Plastics, Inc. was shrunk onto an aluminum substrate having an outside diameter of about 84 mm and a length of about 24.5 cm. The wall thickness of the perfluoroalkoxy Teflon tube after heat shrinking was about 1.25 $\mu$m and the dielectric constant was about 2.1. The aluminum substrate was covered with the perfluoroalkoxy Teflon tube by slipping the tubing onto the substrate carefully so as to avoid nicks, creases, or scratches. The tubing was about 5 cm longer than the aluminum substrate at each end and had an inside diameter of about 95 mm. The substrate with the loosely fitting tubing was placed in a hot forced air oven at about 350° F. (177° C.) and rotated for about one hour at about one revolution per minute to ensure uniform covering without wrinkling. The resulting roll was removed from the oven, cooled and the excess tubing trimmed even with the ends of the aluminum substrate. It was estimated that the tube shrinkage was about 20 to 25 percent and a grip force of about 5 psi to 8 psi was attained. The resulting electrographic drum was substituted for the drum in Example I except that the interactive components in the test machine were spaced to accommodate the diameter of the longer drum. The results of the tests indicate that the voltage variation around the drum was about ±90 volts and although image resolution was adequate, the print density was about 0.6. The roll was removed from the machine and placed in a lath to grind the surface of the coating to attain a uniform wall thickness of about 85 μm. The ground drum was tested in the modified 2830 fixture and the charge voltage variation around the drum was down to about ±35 volts and print density had increased to about 0.9 because of the increased charge density applied to the thinner coating to produce the same surface potential.

EXAMPLE IX

It is believed that sililar results will be obtained if the procedures described in Example VIII are repeated with substantially identical steps and materials except that the inner surface of the perfluoroalkoxy Teflon is coated with Red Spot Olefin black conductive primer LE12644 (available from Red Spot Research). The conductive coating is applied by brush prior to mounting the tube on an aluminum drum. The tube is heat shrunk on the aluminum drum and the resulting assembly is placed on a lath where the wall thickness of the perfluoroalkoxy Teflon tube is ground to a thickness of about 85 μm. Electrical and print test results essentially identical to those described in Example I would be expected.

EXAMPLE X

The procedures described in Example VIII were repeated except that a copolymer of ethylene and tetrafluoroethylene (Tefzel, available from E.I. duPont de Nemours & Co.) was used as the seamless tube material. The wall thickness of the Tefzel tube after heat shrinking and grinding was about 155 μm and the dielectric constant was about 2.6. The ground drum was tested in the modified 2830 fixture and the voltage variation around the roll was about ±45 volts, charge decay rate was about 3 volts/second and print density was about 0.88 with good resolution.

EXAMPLE XI

A heat shrinkable polyterephthalate acid ester film manufactured as a seamless tube identified as Nalophan, available from Hoechst Celanese Corporation (also available as Kalle film in Europe) was used to cover an aluminum drum having a diameter of about 84 mm. The polyterephthalate acid ester tube had an inside diameter of about 90 mm. The polyterephthalate acid ester tube was heat shrunk onto the drum by heating the tube to about 180° C. for about 15 minutes. After heat shrinking, the polyterephthalate acid ester tube wall had a wall thickness of about 1.1 mil (28 micrometers), with low charge decay and a dielectric constant of about 3.4. Another electrographic drum is prepared as above except that the aluminum drum is coated with a conductive coating, comprising about 15 percent by weight carbon black (Black Pearls 2000, available from Cabot Corp.) in a polyester binder (49000, available from E.I. duPont de Nemours & Co.) having a thickness of about 6 μm. During the heat shrinking step, the conductive layer softens and flows to form a tight seal with the aluminum drum substrate and to the polyterephthalate acid ester tube. The print density obtained with this conductive coated aluminum drum is about 0.7. This relatively low print density is consistent with the expectations from a thin dielectric imaging member.

EXAMPLE XII

A polyimide tube was prepared from solution by centrifugal casting. The centrifugal casting apparatus comprised a cylindrical nickel mold having an internal diameter of about 8.2 cm and a length of about 35 cm. The cylindrical mold was mounted in a holder on the shaft of an air motor. A silicone resin release coating was prepared from 2.5 gms of silicone resin (F-544, available from SWS Silicones Inc.) and 0.125 gms of catalyst (F-546, available from SWS Silicones Inc.) dissolved in 50 gms each of toluene, xylene and methylene chloride. This solution was applied as a coating to the interior of the cylindrical mold by flow coating and the solvent was allowed to evaporate. The cylindrical mold was then placed in an oven at 180° C. for 15 minutes to cure the silicone coating. A ridge of Teflon tape was applied to the inside edge of each end of the cylindrical mold prior to casting of a tube. The Teflon tape dams prevent the polyimide solution from draining from the cylindrical mold during evaporation of the solvent from the polymer. A coating solution of about 140 gms of polyimide (XU 218, available from CIBA-GEIGY Corp.) and about 400 gms of a 1:1 by weight mixture of methylene chloride and tetrachloroethylene was introduced into the interior of the cylindrical mold while it was rotating about its axis by pouring the solution from a small beaker while one end of the cylindrical mold was tipped slightly upward. The cylindrical mold was returned to a horizontal position and the centrifugal force caused by the rotation of the cylindrical mold at moderate speed leveled the coating solution. A stream of air at about 100° C. was blown through an open end of the cylindrical mold to evaporate the solvent mixture for about one hour. The cylindrical mold was then removed from the air motor and placed in an oven at 150° C. for 45 minutes to remove the residual solvent from the film. During this drying process the polyimide film release from the mandrel to give a seamless tube. The tube was of good quality with one end being of non-uniform thickness due to wobble of the mandrel during rotation and casting of the tube. The wall thickness of the tube was about 80 μm to about 125 μm. The tube had good clarity, tensile properties, and mechanical integrity. It is believed that a precision mounting for the cylindrical mold would eliminate the wobble and provide a more uniform tube. This tube was then mounted on a cylindrical support member by heating the polyimide tube to about 200° C. and expanding the tube diameter to about 85 mm. While the tube was expanded, an aluminum drum having a diameter of 84 mm was inserted into the tube and the combination was heated to about 300° C. to shrink the polyimide tube onto the drum. The dielectric constant of the polyimide tube was about 3.2. The drum was tested in the modified 2830 fixture and voltage variation around the roll was from about ±25 V to ±52 V depending on the thickness variation in the coating, chage decay was about 5 V per second.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. An ionographic imaging process comprising providing an ionographic imaging member comprising a cylindrical support member bearing a shrunken continuous flexible tube around the periphery of said support member, said tube comprising a dielectric thermoplastic film forming polymer having a $T_g$ of at least about $-40°$ C. and charge decay of less than about 2 nanocoulombs per cm$^2$ per second, said tube having a substantially uniform thickness and an outer imaging surface and an inner surface substantially parallel to each other, the interface between said inner surface of said tube and said periphery of said support member comprising electrically conductive material; forming an electrostatic latent image on said outer imaging surface of said tube, said latent image having a developable difference in potential between background areas and image areas; applying electrostatically attractable toner particles to said electrostatic latent image with a developer applicator while supplying a bias potential to said developer applicator whereby toner particles deposit on said outer imaging surface of said tube in image configuration.

2. An ionographic imaging process according to claim 1 comprising providing forming an electrically conductive layer on said inner surface of said tube prior to shrinking said tube and shrinking said tube to bring said electrically conductive layer on said inner surface of said tube against said cylindrical support member.

3. An ionographic imaging process according to claim 2 wherein said periphery of said support member is electrically conductive.

4. An ionographic imaging process according to claim 1 including uniformly charging said imaging surface to form a uniformly charged imaging surface and imagewise discharging said uniformly charged imaging surface with an ion stream to form said electrostatic latent image.

5. An ionographic imaging process according to claim 1 wherein said electrostatically attractable toner particles comprise dry toner particles having an average particle size of between about 8 micrometers and about 15 micrometers admixed with larger carrier particles.

6. An ionographic imaging process according to claim 1 wherein said electrostatically attractable toner particles comprise a dry single component developer or comprise a component in a liquid developer.

7. A process for preparing an ionographic imaging member comprising providing a flexible, shrinkable tube comprising a dielectric film forming polymer having a Tg of at least about $-40°$ C., charge decay of less than about 2 nanocoulombs per cm$^2$ per second and elastic memory, said tube having a substantially uniform thickness and an outer surface and an inner surface substantially parallel to each other, providing a cylindrical support member having an outer diameter that is less than the inner diameter of said flexible tube, applying a continuous coating on said inner surface of said tube or on the outer surface of said cylindrical support member, said coating comprising a material selected from the group consisting of an electrically conductive material, an adhesive material and mixture thereof, shrinking said tube to reduce said inner diameter of said flexible tube to bring said inner surface of said tube and said outer surface of cylindrical support member into intimate physical contact with said continuous coating.

8. A process for preparing an ionographic imaging member according to claim 7 wherein said tube has a thickness of at least about 17 micrometers after said shrinking.

9. A process for preparing an ionographic imaging member according to claim 7 wherein said continuous coating is an adhesive material applied to said inner surface of said tube or on said outer surface of said cylindrical support member prior to inserting said cylindrical support member within said tube.

10. A process for preparing an ionographic imaging member according to claim 7 wherein said tube has a thickness of between about 75 micrometers and about 400 micrometers after said shrinking.

11. A process for preparing an ionographic imaging member according to claim 7 including expanding said tube prior to inserting said cylindrical support member within said tube.

12. A process for preparing an ionographic imaging member according to claim 7 including working said tube to expand the inner diameter of said tube prior to inserting said cylindrical support member within said flexible tube.

13. A process for preparing an ionographic imaging member according to claim 7 including inflating said flexible tube with a pressurized fluid prior to inserting said cylindrical support member within said flexible tube.

14. A process for preparing an ionographic imaging member according to claim 13 including expanding said tube by sealing one end of said tube and inflating said flexible tube with a pressurized fluid.

15. A process for preparing an ionographic imaging member according to claim 7 including heating said tube to a temperature greater than the $T_g$ of said polymer, expanding said tube, and cooling said tube while maintaining the tube in an expanded state to freeze said tube in said expanded state prior to inserting said cylindrical support member within said flexible tube.

16. A process for preparing an ionographic imaging member according to claim 7 including applying heat to said tube to shrink said tube.

17. A process for preparing an ionographic imaging member according to claim 7 including heating said tube above the $T_g$ of said polymer, expanding said tube, solidifying said polymer, placing said tube over said cylindrical support, and heating said tube to a temperature greater than said $T_g$ of said polymer to shrink the diameter of said tube at least 0.1 percent less than the size prior to shrinking.

18. A process for preparing an ionographic imaging member according to claim 7 wherein said film forming polymer is selected from the group consisting of polyurethane, halogenated polymers, polyester, polyimide and polyamide-imide.

19. A process for preparing an ionographic imaging member according to claim 7 wherein said tube comprises a film forming polymer having a dielectric constant of from about 1.5 to about 40 and a thickness after shrinking of at least about 17 micrometers, forming a barrier to charge injection between said inner surface of said tube and said outer surface of cylindrical support member.

20. A process for preparing an ionographic imaging member according to claim 7 wherein said tube has a dielectric strength greater than about 20 V/micrometer and a charge decay of less than about 2 nanocoulombs per cm$^2$ per second.

21. A process for preparing an ionographic imaging member according to claim 7 wherein the surface and bulk resistivity of said tube is at least about $10^{10}$ ohm cm at between about 10 percent to about 80 percent relative humidity and between about 16° C. and about 60° C.

22. A process for preparing an ionographic imaging member according to claim 7 wherein said tube comprises inorganic particles dispersed in a film forming polymer.

23. A process for preparing an ionographic imaging member according to claim 22 wherein said tube comprises from about 20 percent by weight to about 100 percent by weight film forming polymer and up to about 80 percent by weight of dispersed inorganic particles, based on the total weight of said tube.

24. A process for preparing an ionographic imaging member according to claim 8 wherein said electrically conductive material comprises carbon black dispersed in a binder or a polypyrrole polymer complex.

25. A process for preparing an ionographic imaging member according to claim 7 wherein said cylindrical support member is electrically conductive.

26. A process for preparing an ionographic imaging member according to claim 7 including removing material from said outer surface of said tube after said shrinking to reduce the thickness of said tube while simultaneously maintaining a uniform tube thickness of at least about 17 micrometers.

* * * * *